US008775538B2

(12) United States Patent
Heikes et al.

(10) Patent No.: US 8,775,538 B2
(45) Date of Patent: *Jul. 8, 2014

(54) METHODS FOR CAPTURING ELECTRONIC MESSAGES BASED ON CAPTURE RULES RELATING TO ONLINE CONTEXTS OF USERS

(75) Inventors: Brian Dean Heikes, Ashburn, VA (US); Kristine Amber Krantz, Alexandria, VA (US); Kelly Monroe Mathews, Bristow, VA (US); Russell Scott Medeiros, Ashburn, VA (US); Venkatesh Ramanathan, Herndon, VA (US); Richard W. Robinson, Jr., Reston, VA (US); Perry E. Miranda Roman, Arlington, VA (US); Edward L. Sears, Reston, VA (US); Andrew L. Wick, McLean, VA (US); Deborah Ruth Yurow, Arlington, VA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/619,009

(22) Filed: Sep. 14, 2012

(65) Prior Publication Data

US 2013/0067002 A1 Mar. 14, 2013

Related U.S. Application Data

(63) Continuation of application No. 12/689,699, filed on Jan. 19, 2010, which is a continuation of application No. 10/825,617, filed on Apr. 16, 2004, now Pat. No. 7,653,693.

(60) Provisional application No. 60/531,988, filed on Dec. 24, 2003, provisional application No. 60/500,369, filed on Sep. 5, 2003.

(51) Int. Cl.
*G06F 13/00* (2006.01)
*G06Q 10/10* (2012.01)

(52) U.S. Cl.
CPC ................................ *G06Q 10/107* (2013.01)
USPC .......................................................... 709/206

(58) Field of Classification Search
CPC .... H04L 12/58; H04L 12/581; H04L 12/5855
USPC .......................................................... 709/206
See application file for complete search history.

(56) References Cited

U.S. PATENT DOCUMENTS 6,161,129 A 12/2000 Rochkind
(Continued)

FOREIGN PATENT DOCUMENTS

CN 1348296 5/2002
(Continued)

OTHER PUBLICATIONS

Automated feature of Internet Explorer, www.geocities.com/technofundo/tech/web/ie_autocomplete.html, pp. 1-6, Feb. 18, 2004.

(Continued)

Primary Examiner — Robert B Harrell
(74) Attorney, Agent, or Firm — Keller Jolley Preece

(57) ABSTRACT

Managing instant messages may include receiving instant messages created by or on behalf of one or more message sources for delivery to an intended recipient. From among the received instant messages, qualifying instant messages may be identified that satisfy a capture rule, and two or more of the qualifying instant messages may be captured. The intended recipient may be informed of the captured instant messages unobtrusively, and also may be enabled to manage the captured instant messages.

31 Claims, 11 Drawing Sheets

(56) References Cited

U.S. PATENT DOCUMENTS

| | | | |
|---|---|---|---|
| 6,463,464 | B1 | 10/2002 | Lazaridis et al. |
| 6,606,647 | B2 | 8/2003 | Shah et al. |
| 6,636,850 | B2 | 10/2003 | Lepien |
| 6,868,498 | B1 | 3/2005 | Katsikas |
| 7,403,942 | B1 | 7/2008 | Bayliss |
| 7,475,113 | B2 | 1/2009 | Stolze |
| 7,752,273 | B2 | 7/2010 | Ito et al. |
| 8,150,922 | B2 | 4/2012 | Griffin et al. |
| 2002/0066036 | A1 | 5/2002 | Makineni et al. |
| 2004/0024892 | A1 | 2/2004 | Creswell et al. |
| 2004/0111261 | A1 | 6/2004 | Chaudhari et al. |
| 2004/0137882 | A1 | 7/2004 | Forsyth |
| 2004/0154022 | A1* | 8/2004 | Boss et al. .......... 719/310 |
| 2005/0198164 | A1 | 9/2005 | Moore et al. |
| 2007/0185957 | A1 | 8/2007 | Mandalia et al. |
| 2008/0008106 | A1 | 1/2008 | Boberg et al. |

FOREIGN PATENT DOCUMENTS

| | | |
|---|---|---|
| DE | 10048653 | 4/2002 |
| EP | 0889660 | 1/1999 |
| EP | 1011243 | 6/2000 |
| EP | 1054329 | 11/2000 |
| EP | 1071295 | 1/2001 |
| EP | 1091532 | 4/2001 |
| EP | 1102443 | 5/2001 |
| EP | 1104961 | 6/2001 |
| EP | 1104964 | 6/2001 |
| EP | 1104965 | 6/2001 |
| EP | 1113619 | 7/2001 |
| EP | 1113620 | 7/2001 |
| EP | 1113631 | 7/2001 |
| EP | 1113640 | 7/2001 |
| EP | 1113659 | 7/2001 |
| EP | 1113677 | 7/2001 |
| EP | 1207655 | 5/2002 |
| EP | 1213874 | 6/2002 |
| EP | 1237384 | 9/2002 |
| EP | 1248484 | 10/2002 |
| EP | 1248486 | 10/2002 |
| EP | 1255414 | 11/2002 |
| EP | 1274222 | 1/2003 |
| GB | 2328835 | 3/1999 |
| GB | 2357932 | 7/2001 |
| GB | 2368747 | 5/2002 |
| JP | 04-86950 | 3/1992 |
| JP | 08-123821 | 5/1996 |
| JP | 09-247334 | 9/1997 |
| JP | 11-161682 | 6/1999 |
| JP | 11-328194 | 11/1999 |
| JP | 2000-148795 | 5/2000 |
| JP | 2000-222424 | 8/2000 |
| JP | 2002-7479 | 1/2002 |
| JP | 2001-109752 | 4/2002 |
| JP | 2002-132832 | 5/2002 |
| JP | 2002-175301 | 6/2002 |
| KR | 20011048800 | 6/2001 |
| KR | 1020010012984 | 9/2002 |
| WO | WO 97/34244 | 9/1997 |
| WO | WO 97/37303 | 10/1997 |
| WO | WO 98/20410 | 5/1998 |
| WO | WO 98/47270 | 10/1998 |
| WO | WO 99/34628 | 7/1999 |
| WO | WO 00/10099 | 2/2000 |
| WO | WO 00/42791 | 7/2000 |
| WO | WO 00/43892 | 7/2000 |
| WO | WO 00/47270 | 8/2000 |
| WO | WO 00/79396 | 12/2000 |
| WO | WO 01/06748 | 1/2001 |
| WO | WO 01/40957 | 6/2001 |
| WO | WO 01/41477 | 6/2001 |
| WO | WO 01/63423 | 8/2001 |
| WO | WO 01/67622 | 9/2001 |
| WO | WO 01/67787 | 9/2001 |
| WO | WO 01/69406 | 9/2001 |
| WO | WO 01/80079 | 10/2001 |
| WO | WO 02/03216 | 1/2002 |
| WO | WO 02/19643 | 3/2002 |
| WO | WO 02/28046 | 4/2002 |
| WO | WO 02/073886 | 9/2002 |
| WO | WO 02/077840 | 10/2002 |
| WO | WO 02/093400 | 11/2002 |
| WO | WO 02/093875 | 11/2002 |
| WO | WO 03/021929 | 3/2003 |
| WO | WO 2006/026908 | 3/2003 |
| WO | WO 2004/111812 | 12/2004 |
| WO | WO 2004/111871 | 12/2004 |
| WO | WO 2005/086723 | 9/2005 |
| WO | WO 2005/089286 | 9/2005 |
| WO | WO 2006/068955 | 6/2006 |

OTHER PUBLICATIONS

"Approved Database for KnockKnock," http://www.knockmail.com/support/appdatabase.html, pp. 1, as accessed on Dec. 4, 2003.
A. Dornan, "Instant Gratification [instant messaging]", Network Magazine, Aug. 2000, INSPEC p. 9.
A.C.M. Fong et al., "Towards an Open Protocol for Secure Online Presence Notification", Computer Standards & Interfaces, Sep. 2001, INSPEC p. 2.
AE. Milewski et al., "Providing Presence Cues to Telephone Users", Proceedings of CSCW 2000, ACM Conference on Computer Supported Cooperative Work, Jan. 2000, INSPEC p. 3.
America Online Growing Pains, Newsbytes, Mar. 7, 1995.
Armstrong, R., et al., "Web Watcher: a learning apprentice for the world wide web," Feb. 1, 1995,7 pages.
ATMobile Develops Networking-Sensing Instant Messaging, Dec. 8, 1999, Newsbytes, pp. 1-2.
"A Countermeasure to Duplicate-detecting Anti-spam Techniques," Robert J. Hall, AT&T Labs Technical Report 99.9.1, May 1999, Abst. and pp. 1-26.
Adeptra Services Overview; Nov. 7, 2002; adeptra.com; pp. 1-7.
Adeptra, Features; Nov. 27, 2002; adeptra.com; pp. 1-2.
America Online Inc., "AOL Instant Messenger", Aug. 29, 2000, Internet: www.aol.com/aim/ (18 pages).
America Online Inc., New AIM 4.7, Sep. 27, 2001, Internet: http://aim.aol.com (7 pages).
"Announce: Implementation of E-mail Spam Proposal," Maurice L. Marvin, news.admin.net-abuse.misc, Aug. 3, 1996, 2 pages.
"A Reputation System for Peer-to-Peer Networks," Gupta et al., Jun. 1-3, 2003, NOSSDAV'03, Monterey, California, pp. 144-152.
"BestCalls.com Announces the BestCalls Technology Index," Business Wire, Jun. 30, 1999, Business Wire, (2 pages).
"Business at Cyberspeed; Brainstorm Becomes Quick Internet Hit," Walker, Jan. 24, 1999, The Washington Post, p. A.01 (4 total pages).
"Better Bayesian Filtering," Paul Graham, Jan. 2003, pp. 1-11, http://www.paulgraham.com/better.html.
B. Raman et al., "Universal Inbox-Providing Extensible Personal Mobility and Service Mobility in an Integrated Communication Network", Proceedings Third IEEE Workshop on Mobile Computing Systems and Applications, Oct. 2000, INSPEC p. 7.
Brown et al., "WWW Plug-Ins Companion," Que Corporation, Oct. 1996, pp. 351-362.
Business Information Corporation, Sep. 1, 1999, Atmobile.com Enters 'IM' World.
Business Wire Atmobile Corporation, AtMobile awarded U.S. Patent Covering Key Elements of its Wireless Instant Messaging System, Sep. 13, 1999.
Bryan Pfaffenberger, Netscape Navigator Gold, AP Professional, Jan. 1997, 4 pages.
Cerulean Studios, "Trillian Pro: No Boundaries," (Overview, New Features, Tech Specs, Corporate, Product Tour—16 pages) 1999-2004; first release Jul. 2000.
Cerulean Studios, "Trillian Pro: Your Freedom to Chat," (Overview, Features, Screenshots, Tech Specs—8 total pages) 1999-2004; first release Jul. 2000.

(56) References Cited

OTHER PUBLICATIONS

Chen, Hao et al. "Bringing Order to the Web: Automatically Categorizing Search Results." Proceedings of the SIGCHI conference on human factors in computing systems. ACM Press. pp. 145-152, New York, Jan. 2000.
Chung-Hwa Herman Rao et al.; iMobile: A Proxy-Based Platform for Mobile Services; Network Services Research Center AT&T Labs-Rsearch, Aug. 2001.
Chung-Hwa- Rao, H. Di-Fa Chang, Yi-Bing Lin, "iSMS: an integration platform for short meassage service and IP networks," Network, IEEE, vol. 15, No. 2, pp. 48-55, Mar./Apr. 2001.
"Creating a Single List of Contacts-Google Scholar" available at http://scholar.google.com/scholar?h1=en&lr=&q=creating+a+single+list+of+contacts&as... (Mar. 27, 2007), 10 pages.
CommWorks 8250 Personal Communications Management System; Dec. 11, 2002; commworks.com; pp. 1-2.
CommWorks IP Messaging; Dec. 11, 2002; commworks.com; pp. 1-2.
ConNexus to awareness: extending awareness to mobile users, Tang, J.C. and Yankelovich, N. and Begole, J. and Van Kleek M. and Li, F. and Bhalodia J., Proceedings of the SIGCHI conference on Human factors in computing systems, pp. 221-228, Dec. 2001, ACM Press, New York, NY, USA.
"CrushParty.com: Help," retrieved Jun. 12, 2002 from the World Wide Web: http://www.crushparty.com/help.jsp, 3 pages.
CNET Networks Inc., "PopUp Killer", Sep. 13,2001, Internet: download. cnet.com/downloads/O-10059-100-6932612 shtml, (3 pages).
Convergys Interactive Alerts Reduce Customer Care Costs and Improve Customer Satisfaction; convergys.com; pp. 1-2, Jan. 22, 2002.
"Digital Artifacts for Remembering and Storytelling: Post History and Social Network Fragments," Viegas et al., retrieved from the World Wide Web: http://we.media.mit.edu/-fviegas/papers/posthistory.snfpdf, (10 pages), Jan. 2004.
Danny Sullivan, "What People Search for," Search Engine Watch, pp. 1-4, http://searchenginewatch.com/facts/searches.html (visited Feb. 13, 2003).
"Degrees of Separation Email Spam Protection", Halfbakery: Degrees of Separation Email Spam Protection, reprinted from http://halfbakery.com/idea/Degrees-20 of-20Separation-20Email-20Spam-20Protecti... printed on Mar. 1, 2004 (3 pages).
"Denied Database for KnockKnock," http://www.knockmail com1 support/denydatabase.html, pp. 1, as accessed on Dec. 4, 2003.
"Email Server Control for KnockKnock," http://www.knockmail.com/supporUemailservcont,html, pp. 1-2, as accessed on Dec. 4, 2003.
Ed Bott and Ron Person, UsingWindows 95 with Internet Explorer 4.0, Feb. 17, 1998, Que, Special Edition, (21 pages).
"Finding Others Online: Reputation Systems for Social Online Spaces," Jensen et al., Apr. 20-25, 2002, CHI, Minneapolis, Minnesota, vol. 4, Issue 1, pp. 447-454.
Global Solutions Directory; Nov. 7, 2002; softwaresibm.com; pp. 1-5.
Google Zeitgeist—Search patterns, trends, and surprises according to Google, Jan. 2003, pp. 1-2, http://www.google.com/press/zeitgeist.html (visited Feb. 13, 2003).
G. Held, "Instant Messaging Finds its Voice", Network Magazine, May 2001, INSPEC p. 5.
G. Reif et al.; A Web-based Peer-to-Peer Architecture for Collaborative Nomadic Working; Technical Univesrity of Vienna, Distributed Systems Group, Jun. 20, 2000.
Gross et al., "Computer-Supported Cooperative Work and the Internet," IEEE, Sep. 1996, 00. pp. 425-430.
H. Schulzrinne et al., "The IETF Internet Telephony Architecture and Protocols", IEEE Network, May-Jun. 1999, INSPEC p. 11.
Haim Schneider, Lotus Developer Domain, "Adding a popup menu to your Sametime links", pp. 1-8, Jul. 1, 2003.
Hubbub: a sound enhanced mobile instant messenger that supports awareness and opportunistic interactions, Issacs, E. and Walendowski A.m and Ranganathan, D., Proceedings of the SIGCHI conference on Human Factors in computing systems: Changing our world, changing ourselves, pp. 179-186, Apr. 2002, ACM Press New York, NY, USA.
Hottie or Nottie? Web Site Voters Let You Know Whether You Sizzle or Fizzle, Marino, Jul. 11, 2001, Florida Times Union, p. C.1. (2 total pages).
Home-tribe.net, http://washingtondc stribe meUmessage/24434dIb-817b-4580 -aa42 -3bffa15f26a?page=1 , (4 pages), printed from Internet Dec. 13, 2004, message dated Oct. 19, 2003.
http://www.friendster.com, (17 pages), Dec. 2004.
http://www.knockrnail.com/support/newsettings.jpg, as accessed on Dec. 4, 2003.
"Icq.anywhere, Email Features-Email Center-ICQ.com," retrieved Apr. 29, 2004 from the World Wide Web: http://www.icq.com/email/popular-features.html, pp. 1-5.
Ion Adroutsopoulos et al., "Learning to Filter Spam E-Mail: A Comparison of a Naive Bayesian and a Memory-Based Approach", University of Athens, Jun. 2000, pp. 1-12.
Ipipi Frequently Asked Questions; Nov. 6, 2002; ipipi.com; pp. 1-2.
Ignite Software: Parent Tools Feature Set, "Parent Tools Features," http://www.parent-tools.com/features.htm, Ignite Software, pp. 1-3, as accessed on Dec. 10, 2003.
ICQ 99a, "Welcome to ICQ version 99a", XP-002163918, ICQ Inc., Nov. 1998.
"Instant Messaging is Everyone's Business," Yahoo Business Messenger, Yahoo!, Mar. 2003.
IBM Lotus Software, Sametime Everyplace FAQ Overview Information, pp. 1-3, http://www.lotus.com/products/wireless.nsf/allpublic.., (visted Jul. 28, 2003).
IBM Lotus Software, Sametime Everyplace Wireless Collaboration that's Fit for e-Business, pp. 1-6, http://www.lotus.com/products.wireless.nsf/allpublic.., (visited Jul. 28, 2003).
IM Means Business IEEE Spectrum, Nov. 2002.
imForwards.com-FAQ's; Oct. 21, 2003.
Index of /tarvizo/oldfiles/elips/tnt-2.4, Jul. 2, 2001, TNT, http://web.mit.edu/tarvizo/oldfiles/elips/tnt-2.4/.
Instant messaging in teen life, Grinter, R.E. and Palen, L., Proceedings of the 2002 ACM conference on Computer supported cooperative work, pp. 21-30, Nov. 2002, ACM Press, New York, NY, USA.
Instant Messaging with Mobile Phones to Support Awareness, Mitsuoka, M. and Watanabe, S. and Kakuta, J. and Okuyama, S., pp. 223-230, Jan. 2001, IEEE.
"Idea for Online Networking Brings Two Entrepreneurs Together," Patents: Idea for Online Networking Brings Two Entrepreneurs Together, reprinted from http://www.nytimes.com/2003/12/01/technology/technology-media-patents-idea-for-online-networking-brings-two-entrepreneurs.htmlOlpatt.html?acbmn1+0
&adxnnlx=107029 . . . , printed on Nov. 5, 2004 (2 pages).
"Instant Messaging for Gamers," PC Gamer, May 2004, vol. 11, No. 5, (2 pages).
J. Felix Hampe et al., Mobile Electronic Commerce: Reintermediation in the Payment System, Electronic Commerce: The End of the Beginning 13th International Bled Electronic Commerce Conference Bled, Slovenia, Jun. 19-21, 2000.
J. Dudley, "Telstra targets Net spammers", news.com.au, Dec. 2, 2003.
Jabber, Inc., Jabber Wireless Gateway Overview, May 2001.
"Jabber" http://www.jabber.com/index.cgi?CONTENTID=9, as accessed on Dec. 4, 2003.
Jennifer B. Lee, "From 100 countries, a Google snapshot of what's going on," International Herald Tribune, Nov. 29, 2002, pp. 1-3, http://www.iht.com.
Joanna Glasner, "Social Nets Find Friends in VCs", Nov. 17, 2003, available at http://www.wired.com/culture/lifestyle/news/2003/11/61227?currentPage=al.
Jonathan B Postel, "Simple Mail Transfer Protocol", RFC788, Information Science Institute, Nov. 1981.
Julian Byrne, "My Spamblock was thrwarting UCE address culling programs", news.admin.net-abuse.e-mail, Jan. 19, 1997.
"Knock Settings ServersTab," http://www.knockmail.com/support/advserverset.html, pp. 1-2, as accessed on Dec. 4, 2003.

(56) References Cited

OTHER PUBLICATIONS

Komatsu et al., "Text Input with Dynamic Abbreviation Expansion," IPSJ SIG Notes, vol. 2001, No. 87, Sep. 14, 2008, pp. 133-138, in Japanese with a partial English Translation.

Kirk Scott, Ubique's Virtual Places: Communication and interaction on the World Wide Web', 1 page, http://www.w3.org/collabroation/workshop/proceedings/p2.html, (visted Jul. 28, 2003).

Kyungkoo Jun, et al., "Agent-Based Resource Discovery", IEEE (Feb. 2000), 10 pages.

Laliberte et al., "A Protocol for Scalable Group and Public Annotations," Elsevier, Apr. 1995, pp. 911-918.

Leander Kahney, "Will You Buy a Car From This Man?", Oct. 6, 2003, pp. 1-3, available at http://www.wired.com/techbizlmedia/news/2003/10/60703.

"Learning Spam: Simple Techniques for Freely-Available Software," Bart Massey et ai, Computer Science Dept., Portland, OR USA, Apr. 2003, pp. 1-14.

"Lotus Instant Messaging Everyplace FAQ," retrieved Apr. 29, 2004 from the World Wide Web: http://www.lotus.com/products/product4nsf/wdocs/249c6f083166cd3e85256d7300714407, (3 pages).

Lieberman, H., "Letizia: An Agent that Assists Web Browsing", Aug 20, 1995, pp. 924-929.

"Listserv Control for KnockKnock," http://www.knockmail com/supporUlistservcont.html, pp. 1, as accessed on Dec. 4, 2003.

Luis Felipe Cabrera et al., "Herald: Achieving a Global Event NotificationService", Microsoft Research, May 2001.

M. Castelluccio, "E-mail in Real Time", Strategic Finance, Sep. 1999, INSPEC p. 10.

M. Day, S Aggarwal, G Mohr, J. Vincent, RFC 2279 Instant Messaging/Presence Protocol Requirements, Feb. 2000.

M. Meola et al., "Real-Time Reference Service for the Remote User: From the Telephone and Electronic Mail to Internet Chat, Instant Messaging and Collaborative Software", Reference Librarian, Dec. 1999, 1NSPEC p. 8.

M. Smith et al.; Conversation Trees and Threaded Chats; Collaboration & Multimedia Group, Microsoft Research, Redmond, WA, Feb. 2000.

"Managing your Addresses in Knockmail," http://www.knockmail.com/supporUmanaddresses.html, pp. 1-2, as accessed on Dec. 4, 2003.

McMurray, Susan, "Shield your children from unsuitable Internet content," http://www.microsoft.com/canada/home/internet&security/2.4.8protectwithparentalcontrolshow tosafeguardyourcomputer.asp#, Microsoft Home Magazine, pp. 1-3, as accessed on Dec. 10, 2003.

Mark Handel et al., "TeamPortal: Providing Team Awareness on the Web", Dec. 2000.

McKendrick, Joseph; "Internet Call Centers: New Era in Customer Service", Feb. 2002; VIO, n2, (4 pages).

Microservices: CommWorks Find Me-Follow Me Application; Dec. 11, 2002; commworks.com; pp. 1-2.

Microservices: CommWorks Message Alert System; Dec. 11, 2002; commworks.com; pp. 1-3.

Microservices: CommWorks Message Delivery System; Dec. 11, 2002; commworks.com; pp. 1-2.

Microsoft PressPass; Nov. 7, 2002; microsoft.com; pp. 1-9.

Mobile instant messaging through Hubbub, Issacs, E. and Walendowski, A. and Ranganathan, D., Communications of the ACM, vol. 45, No. 9, pp. 68-72, Sep. 2002, ACM Press New York, NY USA.

Midorikawa, et al., "Part 2 Build up a Comfortable Search Environment via Customization by Rules," PC Japan, vol. 7, No. 10, pp. 172-176, in Japanese with a partial English Translation of p. 172, Nov. 2002.

Mozilla, www.mozilla.org/projects/ml/autocomplete, Mar. 13, 2003.

Moore, J. "AOL's Grand Goal; America Online seeks to transform itself into a major Internet player,"Information Week, Jul. 31, 1995, lines 7-23, pp. 38-42.

N. Liew Kwek Sing; AOL ICQ vs. MSN Messenger; Department of Electronic and Computer Science, University of Southampton, Mar. 2003.

Nardi, BA, Whittaker, S. and Bradner, E., Feb. 2000. Interaction and Outeraction: instant messaging in Action. In Proceedings of the 2000 ACM Conference on Computer Supported Cooperative Work (Philadelphia, Pennslyvannia, USA.) CSCW '00. ACM New York, NY, 79-88.

Nextel Announces On-Line Paging Service Provided by Wireless Services—First Wireless Telephone Messaging Service to Offer Delivery Confirmation, Aug. 12, 1998, NY.

Net Alerts Overview; Nov. 7, 2002; microsoft.com; pp. 1-3.

Neo Mai, Ken Neo. "Buying and selling on the internet; [Computimes, 2* Edition]." New Straits Times. Kuala Lumpur: Jun. 28, 2001. p. 53.

Online! Feb. 1, 2003, pp. 1-2, XP002297111, Webpage of Slipstick Systems: To add addresses automatically to Microsoft Outlook Contacts, http://web.archive.org/web/20030201082058/http://www.slipstick.com/contacts/addauto.htm>, retrieved on Sep.17, 2004 the whole document.

Olsen, Stefanie, "Will instant messaging become instant spamming?,". http://news.com.com/2100-1023-252765.html?legacy=cnet, Feb. 16, 2001, pp. 1-4.

Ozmosys Enterprise; Nov. 7, 2002; ozmosys.com; pp. 1-3.

"Pending Database for KnockKnock," http://www.knockmail coml support/penddatabase.html, pp. 1, as accessed on Dec. 4, 2003.

"Preview Pending Emails in KnockMail," http://www.knockmail.com/supporUpreviewemail.html, pp. 1-2, as accessed on Dec. 4, 2003.

"Protect Your Privacy," MSN Features, http://messenger.msn.com/Feature/Privacy.aspx, as accessed on Dec. 2, 2003.

Parviainen et al., "Mobile Instant Messaging", Jul. 3, 2003 IEEE.

Patrice Godefroid et al., "Ensuring Privacy in Presence Awareness Systems: An Automated Verification Approach". Feb. 2000.

Paul Mutton, "PieSpy Social Network Bot-Inferring and Visualizing Social Networks on IRC", jibble.org, http://lister.linux-srv.anlx.net/piespy, © 2001-2004, pp. 1-18, Mar. 18, 2004.

Per E. Pedersen et al.; Using the Theory of Planned Behavior to Explain Teenager's Adoption of Text Messaging Services; Agder University College, Jun. 2002.

Per E. Pedersen; The Adoption of Text Messaging services among Norwegian Teens: Development and Test of an Extended Adoption Model; SNF-Report No. 23/02; Samfunns-Og Naeringslivsforskning As Bergen, Jun. 2002.

Phillips Business Information corporation—Aug. 23, 1999—Instant messaging has emerged as one of the most popular communication mediums in the world.

Prodigy Launches 100 Interest Groups on the World Wide Web; All Sites Have Deep Links to Chat and Newsgroups; Topics Range from "Adventure Travel" and "Astrology" to "Virtual Reality" and "Wrestling", Business Wire, Sep. 27, 1995, 4 Pages.

"Plaxo-Update Your Address Book," Plaxo Contact Networks, reprinted from http://web.archive.org/web/20030218233638/http://www.plaxo.com printed on Nov. 5, 2004 (available on Feb. 18, 2003), (1 page).

"Plaxo", Plaxo, reprinted from http://web.archive.org/web/20041105072256/http://www.plaxo.com/ printed on Nov. 5, 2004 (available on Feb. 14, 2004) (2 pages).

Parent Tools TheUltimate in Monitoring and Controlling AIM "Parent Tools for AIM," http://www.parent-tools.com/screenshots.htm, pp. 1-4, as accessed on Dec. 10, 2003.

"Reputation Systems," Resnick et al., Dec. 2000, Communications of the ACM, vol. 43, No. 12, pp. 45-48.

"RIM Road: Software: Internet & Network: Webmessenger RIM J2ME/lnstant Messaging," retrieved Apr. 29, 2004 from the World Wide Web: http://www.rimrod.com/software/rim//Webmessenger-RIM-J2ME-lnstant -Messaging-20 . . . , pp. 1-4.

"Reflections on Friendster, Trust and Intimacy," Danah Boyd, Ubicomp 2003, Workshop Application for the Intimate Ubiquitous Computing Workshop. Seattle, WA, Oct. 12-15, 2003, (4 pages).

R. Movva & W. Lai, "MSN Messenger Service 1.0 Protocol", Aug. 1999, Internet Draft, http://toolsietf. org/id/draft-movva-msn-messenger-protocol-oo.bct, 28 pages.

(56) References Cited

OTHER PUBLICATIONS

Reichard, K., "AOL, ICO to Interoperate-But in a Limited Fashion," Oct. 30, 2002, InstantMessagingPlanet, available at www.instantmessagingplanet.com/public/articie.php/1490771.
Ryze home page, www.ryze.com, Dec. 21, 2003, available at http://web.archivesorg/web/20031221010006/http://ryze.com, printed Mar. 16, 2005, 13 pages.
R. Droms, "Dynamic Host Configuration Protocol", Network Working Group, Oct. 1993.
Richard S. Hall, "The Event Desktop: Supporting Event-Enabled Clients on the Web", Freie University, Berlin. Retrieved on May 21, 2013.
Roscheisen et al., "Beyond Browsing: Shared Comments, SOAPs, Trails, and On-line Communities," Elsevier, Apr. 1995, pp. 739-749.
S. Okuyana et al., "New Mobile Service Based on Instant Messaging Technology", Fujitsu, Apr. 2001, INSPEC p. 1.
S. Ortiz, Jr., "Instant Messaging: No Longer Just Chat", Computer, Mar. 2001, INSPEC p. 6.
Schulzrinne, H.; Rosenberg J., "The Session Initiation Protocol: Internet-centric signaling," Communications Magazine, IEEE, vol. 38, No. 10, pp. 134-141, Oct. 2000.
SproWuest Wireless Instant messaging (Nov. 22, 1999) InfoSpace.com, pp. 1-2.
"Six Degrees—New Programs Help Companies 'Mine Workers' Relationships for Key Business Prospects," William M. Bulkeley et al., Marketplace, The Wall Street Journal, Aug. 4, 2003, (3 pages).
SM Cherry "Talk is Cheap, Text is Cheaper" (IEEE Spectrum May 2003).
"Social Network Fragments: An Interactive Tool for Exploring Digital Social Connections." Danah Boyd, Jeff Potter. Sketch at SIGGRAPH 2003. San Diego, California: ACM, Jul. 27-31, 2003, (1 page).
"Social Networking for Business: Release 0.5," Esther Dyson, Esther Dyson's Monthly Report, vol. 21, No. 10, Nov. 25, 2003, www.edventure.com, (36 pages).
"Support Vector Machines for Spam, Categorization," Harris Drucker et al., IEEE Transactions on Neural Networks, vol. 10, No. 5, Sep. 1999, pp. 1048-1054, (7 pages).
"Support Vector Machines," Marti Hearst, IEEE Intelligent Systems, Jul./Aug. 1998, pp. 18-28.
"Social Sites Clicking With Investors," Washingtonpost.com: Social Sites Clicking With Investors, reprinted from http://www.washingtonpost.com/ac2/wp-dyn/A32066-2003Nov12?language=printer printed on Nov. 5, 2004, (2 pages).
"Social Social Networks: Deodorant for the Soul?," Esther Dyson, Esther Dyson's Monthly Report, vol. 21, No. 11, Dec. 12, 2003, www.edventure.com, (36 pages).
"Socialware: Multiagent Systems for Supporting Network Communities," Hattori et al., Mar. 1999, Association for Computing Machinery, Communications of the ACM, vol. 42, Issue 3, (6 pages).
"Spoke Builds on Social Networking Patent Portfolio," Spoke Builds on Social Networking Patent Portfolio, reprinted from http://www.internetnews.com/ent-news/print.php/3073621 printed on Nov. 5, 2004(3 pages).
Solutions Smartdelivery; Nov. 6, 2002; centerpost.com; pp. 1-2.
"SurfControl Instant Message Filter," Instant Message Filter, SurfControl pic. Apr. 2003.
"Spammers Target Instant Message Users," http://www.bizreport.com/article.php?art id=5507 Nov. 13, 2003, pp. 1-4.
"SWF Seeks Attractive Head Shot; To Stand Out, Online Daters Pay for Professional Photos; Cropping out the Ex-Wife," Leiber, Nov. 19, 2003, The Wall Street Journal, p. D.1.
"SVM-based Filtering of E-mail Spam with Content-specific Misclassification Costs," Aleksander Kolcz et al., TextDM '2001 (IEEE ICDM-2001 Workshop on Text Mining); San Jose, CA, 2001, pp. 1-14, Nov. 2001.
"The first Social Software . . . A true Social Adventure," Huminity-Social Networking, Chat Software, Create Personal Free Blogs and My Group . . . , reprinted from http://www.huminity com/ printed on Nov. 5, 2004 (2 pages).

"Text Categorization with Support Vector Machines: Learning with Many Relevant Features," Thorsten Joachims, University of Dortmund, Computer Science Dept., LS-8 Report 23, 1998, (18 pages), Nov. 27, 1997, revised Apr. 19, 1998.
"Technology Journal-Are You Satisfied? EBay's Battle Against Fraud Rests Primarily on a Simple Concept: Customer Feedback," Wingfield, Sep. 23, 2002, Asian Wall Street Journal, p. T.8, (4 total pages).
"Technology Journal: Changing Chat-Instant Messaging is Taking Off, and For Some Users It's Nuzzling Out the Phone," Nick Wingfield, Asian WSJ, Sep. 2000, (5 pages).
"Trillian Discussion Forums-HOWTO: Import ICQ 2003a Contact List," retrieved Apr. 29, 2004 from the World Wide Web: http://trillian.cc/forums/showthread.php?s+&threadid=36475, pp. 1-2.
"Technical Solutions for Controlling Spam," Shane Hird, Proceedings of AUUG2002, Melbourne, Sep. 4-6, 2002, (17 pages).
Tara Hall, Lotus Developer Domain, "Same Place, Sametime with Chris Price", pp. 1-8, http://www.10.lotus.com/ldd/today.nsf/DisplayForm/.., (Visited Jul. 28, 2003), Sep. 2002.
Teraitech; Nov. 7, 2002; teraitech.com; 1 page.
Uhara7, "Re. being invisible to all but one person on your list", alt.chat-programs.icq, Feb. 29, 2000.
Upoc Quick Tour; Nov. 6, 2002; upoc.com; pp. 1-9.
Upoc General Help; Nov. 6, 2002; upoc.com; pp. 1-2.
Upoc NYSale; Nov. 6, 2002; upoc.com; pp. 1-2.
Upoc Entertainment Picks; Nov. 6, 2002; upoc.com; pp. 1-3.
Upoc Frequently Asked Questions; Nov. 6, 2002; upoc.com; pp. 1-6.
Upside, About Our Product; upsideweb.com; pp. 1-5, Nov. 2002.
V, Vittore, "The Next Dial Tone? [instant messaging]", Telephony, Oct. 16, 2000, INSPEC p. 8.
VisiblePath webpages, www.visiblepath.org , Dec. 3, 2003, available at http://web.archive.org/web/20031203132211/http://www.visiblepath.com, printed Mar. 16, 2005, 5 pages.
Walther, M., "Supporting Development of Synchronous Collaboration Tools on the Web with GroCo," Feb. 2-9, 1996, pp. 1-6.
Way-bac machine, handspring treo 270, Jun. 1, 2002.
"Wireless Instant Messaging Solution . . . " Newswire, NY Dec. 8, 1999 Atmobile corp, pp. 1-2.
WebleySystems; CommuniKate Unified Communications Features List; Dec. 11, 2002; webley.com; pp. 1-3.
"Welcome to Huminity World of Connections," Huminity-Home, reprinted from http://web.archive.org/web/20030228131435/www.huminity.com/default.php?intemationa . . . printed on Nov. 5, 2004 (available on Feb. 2, 2003) (1 page).
WebmasterWorld.com Inc., "HTML and Browsers", Mar. 5, 2001, Internet: www.webmaster.com/forum21/637.htm, (2 pages).
www.yahoo.com, Yahoo! Messenger for Text Messaging, Jul. 2002.
Yiva Hard of Segerstad et al.; Awareness of Presence, Instant Messaging and WebWho; Department of Linguistics, Goteborg University; Sweden, Dec. 2000.
Yahoo! Buzz Index, Feb. 13, 2003, 1 page, http://buzz.yahoo.com/overall/.
Yahoo! Buzz Index, Nov. 10, 2002, 1 page.
Yahoo! Messenger, "Messenger Help," (4 total pages) Nov. 2002.
ZeroDegrees home p., www.zerodegrees.com , Jan. 24, 2004, available at http://web.archive.org/web/20040204153037/www.zerodegrees.com/home.htm, printed Mar. 16, 2005, 2 pages.
Zephyr on Athena (AC-34), http://web.mit.edu/olh//Zephyr/Revision.html, 11 pages, Retrieved on May 17, 2013.
European Search Report, European Application No. 03781972.9-2201, dated Feb. 8, 2008, 5 pages.
International Search Report and Written Opinion dated Feb. 15, 2006 for International Application No. PCT/US05/07204, (10 pages).
International Search Report and Written Opinion issued in International Application No. PCT/US05/45663, dated Apr. 11, 2008.
International Search Report issued in Application Serial No. PCT/US05/08476, dated Oct. 16, 2006, (3 pages).
International Search Report issued in International Application No. EP03731244, dated Aug. 30, 2005, (4 pages).
Supplementary European Search Report issued in European Application No. EP05728303, dated Jan. 9, 2009, (4 pages).

(56) References Cited

OTHER PUBLICATIONS

Supplementary European Search Report issued in European Application No. 05857099.5-1238/1836596, PCT/US2005045663, dated Nov. 7, 2008, (5 pages).
International Search Report, PCT/US03/36656, dated Apr. 22, 2004.
Supplementary European Search Report dated Jun. 7, 2006 for Application No. EP 03811631, 3 pages.
Notification of Transmittal of the International Search Report or the Declaration dated Jun. 23, 2004 for International Application Serial No. PCT/US03/36795.
Office Action issued in Chinese Application No. 200480013443.9, mailed Mar. 6, 2009, 20 pages, including English translation.
Office Action mailed Apr. 21, 2005 for European Application no. 97946924.4-1238, 6 pages.
Office Action mailed May 21, 2008 for European Application No. 97946924.4-1238, 10 pages.
International Search Report issued in International Application No. PCT/US05/45630, Dated Oct. 23, 2006.
International Search Report mailed Jan. 27, 2005 for International Application No. PCT/US2004/009422, International Filing Date Mar. 26, 2004.
International Search Report issued in International Application No. PCT/US03/36795, mailed Jun. 23, 2004, 9 Pages.
International Search Report mailed Dec. 27, 2005 for International Application No. PCT/US2004/29291, filed Sep. 8, 2004.
International Search Report, Application Serial No. PCT/US04/23382, dated Feb. 1, 2007, 12 pages.
International Standard, Information technology-telecommunications and information exchange between systems-private integrated services network-specifications, functional model and information flows-Short message service, ISO/IEC21989, Jul. 1, 2002.
European Office Communication issued in Application No. EP 97946924.4-1238 mailed Apr. 5, 2007, 7 pages.
European Oral Proceedings issued in Application No. EP 97946924.4-1238 mailed Feb 6, 2007, 9 pages.
European Oral Proceedings issued in Application No. EP 97946924.4-1238 mailed Oct 7, 2007, 8 pages.
European Office Action, Application Serial No. 03 811 631.5-2201, dated Oct. 4, 2006, 4 pages.
Written Opinion dated Jan. 27, 2005 for International Application No. PCT/US2004/009422, International Filing Date Mar. 26, 2004.
Written Opinion mailed Dec. 27, 2005 for International Application No. PCT/US2004/29291, filed Sep. 8, 2004.
U.S. Appl. No. 10/146,814, Dec. 11, 2006, Office Action.
U.S. Appl. No. 10/146,814, Jul. 2, 2007, Office Action.
U.S. Appl. No. 10/184,002, Jan. 9, 2007, Office Action.
U.S. Appl. No. 10/334,056, Nov. 29, 2004, Office Action.
U.S. Appl. No. 10/334,056, Jul. 6, 2005, Office Action.
U.S. Appl. No. 10/334,056, Oct. 31, 2005, Office Action.
U.S. Appl. No. 10/334,056, May 10, 2006, Office Action.
U.S. Appl. No. 10/334,056, May 21, 2007, Office Action.
U.S. Appl. No. 10/334,056, Nov. 5, 2007, Office Action.
U.S. Appl. No. 10/334,056, May 12, 2008, Office Action.
U.S. Appl. No. 10/334,056, Oct. 30, 2008, Office Action.
U.S. Appl. No. 10/633,636, Oct. 11, 2006, Office Action.
U.S. Appl. No. 10/651,303, May 1, 2009, Office Action.
U.S. Appl. No. 10/715,213, Apr. 26, 2007, Office Action.
U.S. Appl. No. 10/715,213, Aug. 7, 2008, Office Action.
U.S. Appl. No. 10/715,213, Feb. 5, 2009, Office Action.
U.S. Appl. No. 10/715,214, Apr. 20, 2007, Office Action.
U.S. Appl. No. 10/715,214, Oct. 9, 2007, Office Action.
U.S. Appl. No. 10/715,216, Feb. 12, 2007, Office Action.
U.S. Appl. No. 10/715,216, Jan. 11, 2008, Office Action.
U.S. Appl. No. 10/715,216, Aug. 18, 2009, Office Action.
U.S. Appl. No. 10/746,230, Mar. 17, 2009, Office Action.
U.S. Appl. No. 10/746,232, Mar. 18, 2009, Office Action.
U.S. Appl. No. 10/747,263, Mar. 5, 2008, Office Action.
U.S. Appl. No. 10/747,263, Sep. 5, 2008, Office Action.
U.S. Appl. No. 10/747,651, Mar. 5, 2008, Office Action.
U.S. Appl. No. 10/747,651, Feb. 20, 2009, Office Action.
U.S. Appl. No. 10/747,676, Sep. 21, 2007, Office Action.
U.S. Appl. No. 10/747,676, Mar. 31, 2008, Office Action.
U.S. Appl. No. 10/747,678, Sep. 14, 2007, Office Action.
U.S. Appl. No. 10/747,678, Mar. 27, 2008, Office Action.
U.S. Appl. No. 10/747,678, Jun. 12, 2008, Office Action.
U.S. Appl. No. 10/747,678, Dec. 15, 2008, Office Action.
U.S. Appl. No. 10/747,678, Jun. 5, 2009, Notice of Allowance.
U.S. Appl. No. 10/747,682, Oct. 11, 2007, Office Action.
U.S. Appl. No. 10/747,682, Apr. 7, 2008, Office Action.
U.S. Appl. No. 10/747,682, Aug. 19, 2008, Office Action.
U.S. Appl. No. 10/895,421, Jan. 9, 2007, Office Action.
U.S. Appl. No. 10/895,421, Jun. 27, 2007, Office Action.
U.S. Appl. No. 10/895,421, Apr. 16, 2008, Office Action.
U.S. Appl. No. 10/974,969, Mar. 17, 2008, Office Action.
U.S. Appl. No. 10/974,969, Mar. 6, 2009, Office Action.
U.S. Appl. No. 10/974,969, Sep. 8, 2009, Notice of Allowance.
U.S. Appl. No. 10/981,460, Aug. 20, 2008, Office Action.
U.S. Appl. No. 11/015,423, Mar. 2, 2009, Office Action.
U.S. Appl. No. 11/015,424, Mar. 19, 2008, Office Action.
U.S. Appl. No. 11/015,424, May 1, 2009, Office Action.
U.S. Appl. No. 11/015,476, Mar. 2, 2009, Office Action.
U.S. Appl. No. 11/017,204. Dec. 12, 2007, Office Action.
U.S. Appl. No. 11/017,204, Jun. 23, 2008, Office Action.
U.S. Appl. No. 11/023,652, Aug. 30, 2010, Office Action.
U.S. Appl. No. 11/023,652, May 12, 2011, Office Action.
U.S. Appl. No. 11/023,652, Sep. 24, 2012, Office Action.
U.S. Appl. No. 11/079,522, Oct. 16, 2008, Office Action.
U.S. Appl. No. 11/079,522, Apr. 3, 2009, Office Action.
U.S. Appl. No. 11/237,718, Apr. 2, 2009, Office Action.
U.S. Appl. No. 11/408,166, Mar. 18, 2009, Office Action.
U.S. Appl. No. 11/408,166, Sep. 2, 2010, Office Action.
U.S. Appl. No. 11/408,166, Apr. 13, 2011, Office Action.
U.S. Appl. No. 11/408,166, Oct. 17, 2011, Office Action.
U.S. Appl. No. 11/464,816, Apr. 21, 2009, Office Action.
U.S. Appl. No. 12/236,255, Apr. 2, 2010, Office Action.
U.S. Appl. No. 12/236,255, Sep. 17, 2010, Office Action.
U.S. Appl. No. 12/689,699, Feb. 28, 2011, Office Action.
U.S. Appl. No. 12/689,699, Apr. 23, 2012, Office Action.
U.S. Appl. No. 12/689,699, Oct. 9, 2012, Notice of Allowance.
U.S. Appl. No. 12/689,699, Mar. 11, 2013, Office Action.
U.S. Appl. No. 12/689,699, Jun. 18, 2013, Notice of Allowance.
U.S. Appl. No. 13/023,256, Jun. 21, 2011, Office Action.
U.S. Appl. No. 13/184,414, Aug. 17, 2012, Notice of Allowance.
U.S. Appl. No. 13/189,972, Sep. 2, 2011, Office Action.
U.S. Appl. No. 13/372,371, Mar. 26, 2014, Office Action.
U.S. Appl. No. 13/507,429, Mar. 28, 2014, Office Action.
U.S. Appl. No. 13/617,350, Mar. 27, 2014, Office Action.
U.S. Appl. No. 11/023,652, Apr. 29, 2014, Office Action.
U.S. Appl. No. 13/189,972, Apr. 21, 2014, Office Action.
U.S. Appl. No. 13/442,226, Apr. 14, 2014, Office Action.
U.S. Appl. No. 13/617,270, Apr. 10, 2014, Office Action.
U.S. Appl. No. 13/617,330, Apr. 8, 2014, Office Action.
U.S. Appl. No. 13/620,851, Apr. 8, 2014, Office Action.
U.S. Appl. No. 13/766,779, Apr. 11, 2014, Office Action.

* cited by examiner

600

BUDDY LIST SETTINGS

| GENERAL BUDDY | GENERAL IM | FILTERING AND VIEWING | EXPRESSIONS | PRIVACY AND SECURITY |

BUDDY LIST TUTORIAL

CHOOSE YOUR BUDDY LIST PREFERENCES.

☒ SHOW ME MY BUDDY LIST AT SIGN-ON
☒ ALLOW RICH TEXT DISPLAY FOR BUDDIES ON MY BUDDY LIST (WHAT IS RICH TEXT?)
☐ ALLOW OTHER MEMBERS TO SEE WHEN I HAVE BEEN IDLE AFTER 20 MINUTES (WHAT DOES THIS MEAN?)
☒ ALLOW OTHER MEMBERS TO SEE THAT I AM USING A MOBILE DEVICE (WHAT IS A MOBILE DEVICE?)
☒ ALLOW OTHER MEMBERS TO SEE WHAT ENHANCE IM FEATURE I HAVE (WHAT IS AN ENHANCED IM?)
☒ DISPLAY BUDDY QUICKVIEW WHEN I ROLL MY MOUSE OVER THE SCREEN NAMES IN MY BUDDY LIST WINDOW
☒ DISPLAY CONTACTS QUICKVIEW WHEN I ROLL MY MOUSE OVER THE ADDRESS BOOK ICON IN MY BUDDY LIST WINDOW
☒ USE THE IM CATCHER™ ORGANIZER TO CAPTURE IMS FROM UNKNOWN SENDERS (WHAT IS THE IM CATCHER™ ORGANIZER?)
   ☒ USE THE IM CATCHER™ ORGANIZER TO CAPTURE EVERY INCOMING IM.

SCREENNAME CHANGE HOW YOUR SCREENNAME LOOKS          AOL KEYWORD: BUDDY LIST SETTINGS ( SAVE )  ( CANCEL )          ( HELP )

METHODS FOR CAPTURING ELECTRONIC MESSAGES BASED ON CAPTURE RULES RELATING TO ONLINE CONTEXTS OF USERS

CROSS REFERENCE TO RELATED APPLICATIONS

This application is a continuation of U.S. application Ser. No. 12/689,699, filed Jan. 19, 2010, which is a continuation of U.S. application Ser. No. 10/825,617, filed Apr. 16, 2004, now U.S. Pat. No. 7,653,693, which claims priority under 35 U.S.C. §119(e) to U.S. Provisional Application No. 60/531,988, filed on Dec. 24, 2003, and U.S. Provisional Application No. 60/500,369, filed Sep. 5, 2003. The entire contents of each of the aforementioned patents and applications are hereby expressly incorporated herein by reference in their entirety.

TECHNICAL FIELD

This disclosure generally relates to managing instant messages.

BACKGROUND

Instant messages are conversational in nature. To maintain their conversational character, instant messages typically are communicated in real time to a user based on an indication that the user presently is online. Nevertheless, the conversational nature of instant messaging may subject a user who is visible online to undesired real-time advances or interruptions from other online entities. For example, a user who enters an online chat room may be subjected in real-time to instant messages from other individuals, known or unknown to the user, as well as from commercial entities, some of whom may purvey undesirable spam. Having entered an instant messaging conversation with a friend, the user may find the conversation overwhelmed in a cacophony of competing instant messaging voices, each demanding the user's immediate attention. Although the user may use a knock-knock (e.g., a pop-up window that provide the user the option to accept or reject an individual instant message based, for example, on an identification of the sender) to screen instant messages from entities not on a contact list of the user, a knock-knock, like the instant message that it represents, is obtrusive and steals the focus of the user from other tasks or conversations that are at hand.

SUMMARY

In one general aspect, managing instant messages may include receiving instant messages created by or on behalf of one or more message sources for delivery to an intended recipient. From among the received instant messages, qualifying instant messages are identified that satisfy a capture rule, and two or more of the qualifying instant messages are captured. The intended recipient is informed of the captured instant messages unobtrusively and the intended recipient is enabled to manage the captured instant messages.

Implementations may include one or more of the following features. For example, identifying qualifying instant messages that satisfy a capture rule may include identifying received instant messages for which a message source does not correspond to a contact of the intended recipient. A received instant message also may be identified as a qualified instant message based on a degree of separation between the intended recipient and the message source. Unsolicited marketing messages may be identified as qualified instant messages based, for example, on a heuristic and/or a Bayesian method. When the intended recipient is away or prefers not to be disturbed, for example, all received instant messages may be identified as qualified instant messages.

The intended recipient may be informed unobtrusively of captured instant messages without stealing focus from another interface for each instant message that is captured. The intended recipient also may be informed when at least one instant message is captured using an unobtrusive audible or visible cue.

Enabling management of the captured instant messages may include enabling the intended recipient to respond to at least one of the captured instant messages and/or to access information related to a message source associated with the captured instant messages. The intended recipient may be enabled to delete, ignore or block a captured instant message and/or a source of a captured instant message. Further, subsequent instant messages related to a previously deleted, ignored or blocked message or message source, in turn, may be deleted, ignored or blocked without being presented to the intended recipient. In sum, the capture rule may be modified (e.g., automatically or by the intended recipient) based on instant messages previously qualified or captured, for example, to capture or to pass-through subsequent instant messages from the source of a previously captured instant message.

The captured instant messages may be organized and/or presented to the intended recipient according to a plurality of predetermined categories. The predetermined categories may include, for example, categories for known, unknown, trusted and/or un-trusted messages or messages sources. The organization and presentation of the captured instant messaged may be configured by the intended recipient and/or automatically by a computer.

These general and specific aspects may be implemented using a method, a system, or a computer program, or any combination of systems, methods, and computer programs.

Other features will be apparent from the description, the drawings, and the claims.

DESCRIPTION OF DRAWINGS

FIGS. 1-6 illustrate graphical user interfaces (GUIs) that may be used to manage instant messages directed to a user based on the user's online presence.

Like reference symbols in the various drawings indicate like elements.

DETAILED DESCRIPTION

Instant messaging is powerful in its ability to interject itself into the recipient's online experience in order to initiate or further a real-time online conversation. The capabilities of instant messaging may enhance collaboration, networking, and the social value of users' online experiences. Nonetheless, absent the ability to manage receipt of instant messages, a user may find the potential benefits of instant messaging lost in an unrequited babble of insignificant or objectionable instant message voices.

Figure 1:
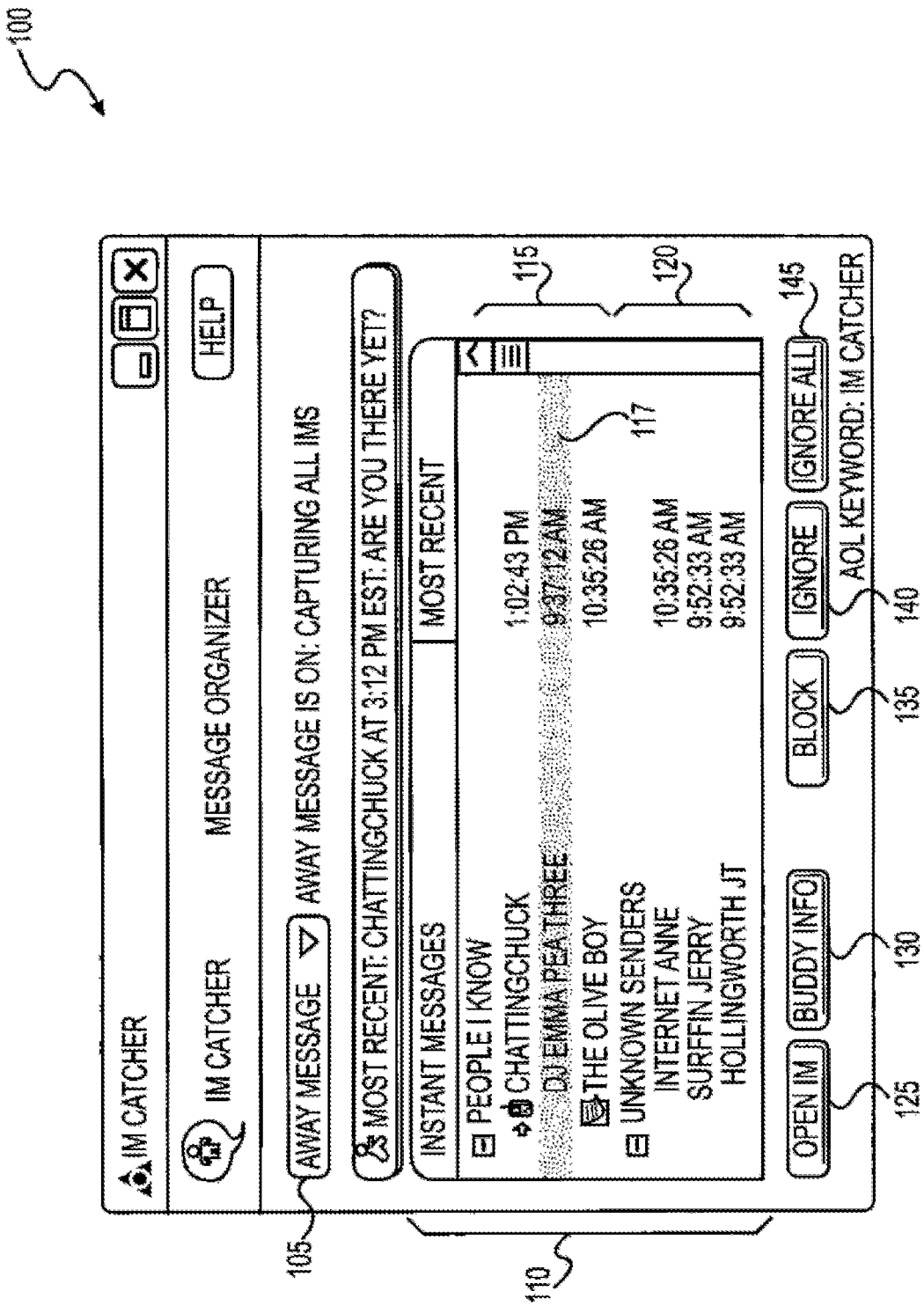

FIG. 1 illustrates a graphical user interface 100 (capture interface) that may be used to manage instant messages received by a user based on the user's online presence (e.g., the user's presence within a chat room or other online forum, and/or the user's present connection to the internet, using, for example, an internet service provider). Using button 105 (the "Away Message" button), the user has indicated to the capture interface 100 that the user presently is unavailable to receive instant messages. The capture interface 100, therefore, captures and organizes all of the instant messages 110 directed to the user while the user is away, and thereby provides the user with an effective and efficient way to handle the instant messages 110 upon returning.

The capture interface 100 is displayed initially when a first instant message is captured. When displayed initially, the capture interface 100 may pop to the front of all open windows or otherwise steal focus to alert the user of its activation. The capture interface 100 typically, however, will not steal focus upon receiving subsequent instant messages. To minimize distraction to the user, instant messages captured to the capture interface 100 do not generate a knock-knock when they are received and do not steal focus from other tasks or demand individualized attention of the user. Consequently, instant messages captured by the capture interface 100 may be deemed less intrusive by the user than instant messages presented to the user immediately or by using a knock-knock. The capture interface 100 may indicate the capture of additional instant messages using a subtle visible or audible cue, such as, for example, by playing a sound or by flashing an icon.

To assist the user in handling the instant messages 110, the instant messages 110 are categorized according to whether the message sender is known 115 or unknown 120 to the user. Furthermore, the instant messages within each category may be organized according to their time of receipt (as shown), or according to some other metric, such as, for example, a metric of anticipated importance or relevance. For each instant message 110 captured and categorized, the user is informed of an identity of the sender (e.g., a screen name) and the time at which the instant message was captured. Based on the information presented, the capture interface 100 enables the user to select a desired instant message, for example, instant message 117 from DJ Emma Pea Three.

Once an instant message is selected, the user may use a single click of a button to accept and open the instant message (using the "Open IM" button 125), to obtain more information regarding the message sender (using the "Buddy Info" button 130), to block all further instant messages from the sender of the instant message (using the "Block" button 135) or to ignore further instant messages from the sender of the instant message for the duration of the user's present online session (using the "Ignore" button 140). The user also may determine to ignore future instant message from all of the captured instant message senders for the duration of the user's online session (using the "Ignore All" button 145). The user may perform screening functions for a selected instant message without generating feedback or otherwise informing the sender of the user's attention to the instant message. Captured instant messages not handled expressly by the user, for example, may be deleted or ignored at the end of the user's online session or when the user closes the capture interface.

Figure 2:
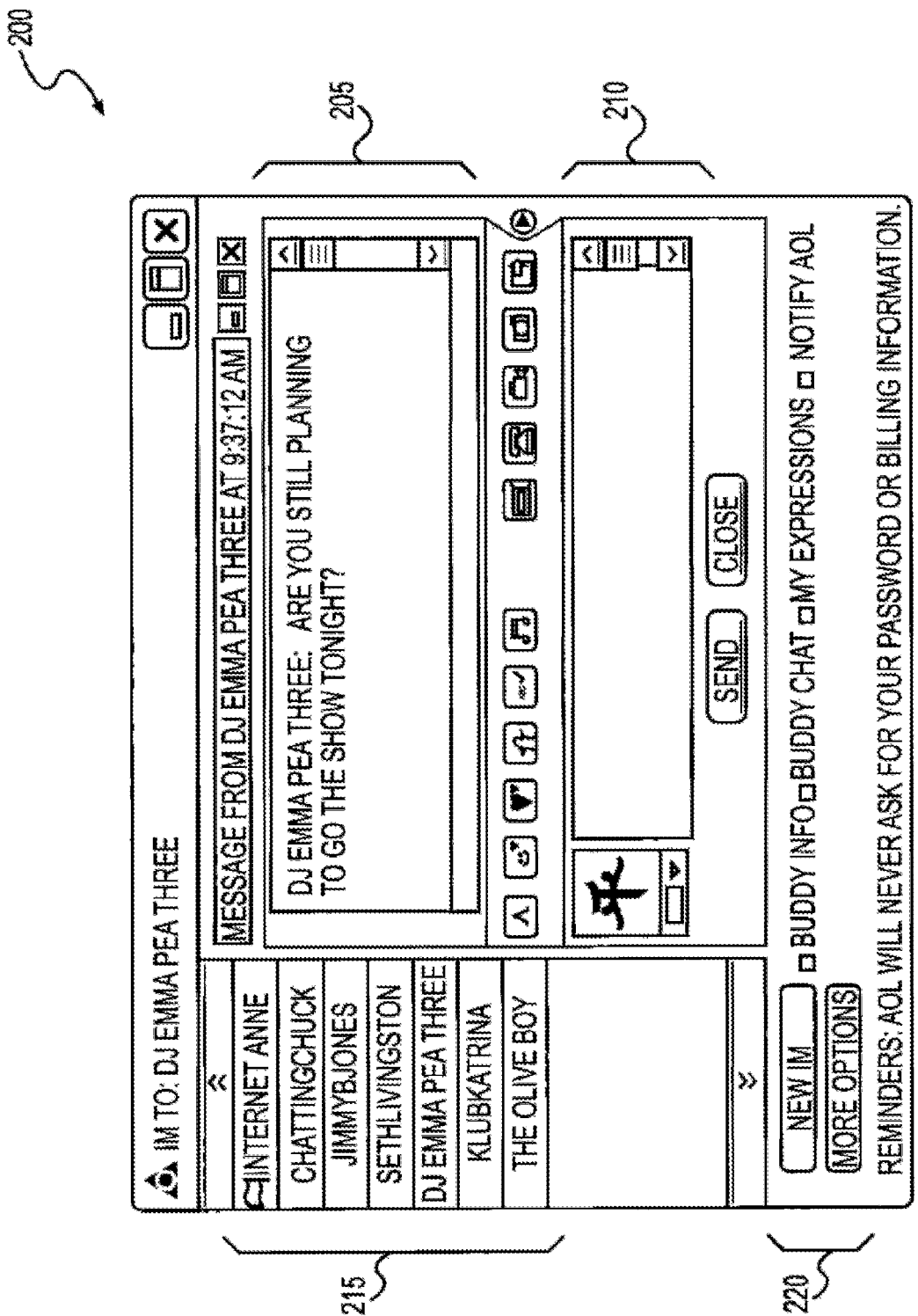

Referring to FIG. 2, the "Open IM" button 125 of the capture interface causes the selected instant message 117 to be presented to the user in a separate message interface 200. The message interface 200 includes a first pane 205 used to display the selected instant message 117 and a second pane 210 by which the user may compose and send an instant message reply. The message interface 200 includes tabs 215 to organize more than one active instant messaging conversation. The message interface 200 also may include controls (e.g., buttons 220) to access relevant instant messaging functionality, typically using only a single click.

Figure 3:
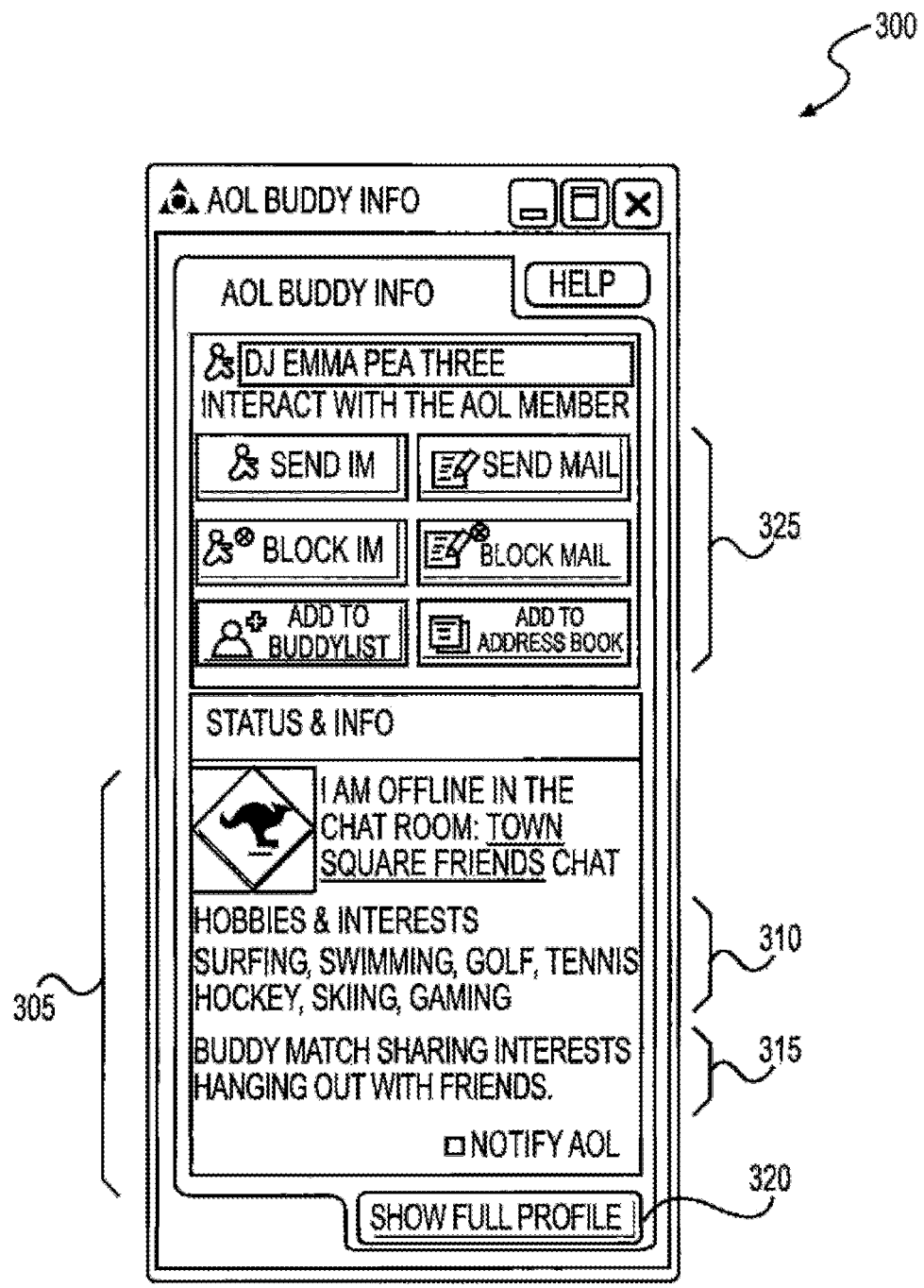

FIG. 3 illustrates a buddy info interface 300 invoked by activating the "Buddy Info" button 130 of the capture interface 100. The buddy info interface 300 provides additional information 305 regarding the sender, DJ Emma Pea Three, of instant message 117. For example, the buddy info interface 300 indicates that DJ Emma Pea Thee presently is online in the Town Square Friends Chat room. The buddy info interface also indicates hobbies and interests 310 of DJ Emma Pea Three as well as interests 315 that DJ Emma Pea Three shares with the user. Button 320 provides access to additional information regarding DJ Emma Pea Three, such as, for example, a phone number, an address, an email address, an age, a gender, family information, educational information, career information, and/or an expertise. Buttons 325 are provided to enable the user to access with one click basic instant messaging options related to DJ Emma Pea Three, such as, for example, to send or block instant messages to or from DJ Emma Pea Three or to add DJ Emma Pea Three to a contact list of the user. The user may use the information provided by the buddy info interface 300 to judge, for example, whether an unknown sender is a person (for whom additional information likely is available) or a software bot (for which additional information likely is not available).

Figure 4A:
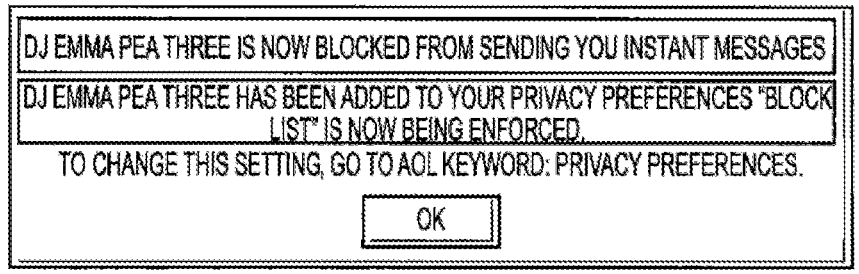
Figure 4B:
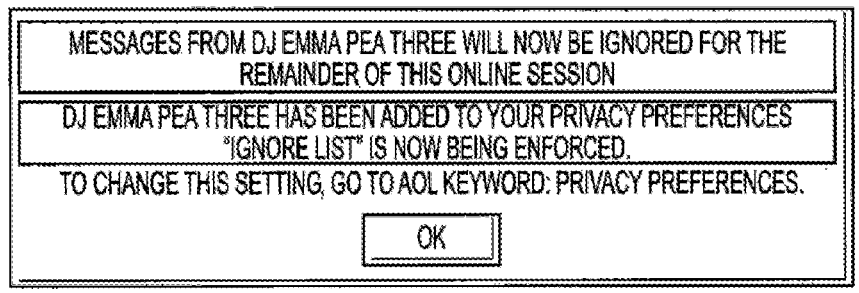
Figure 4C:
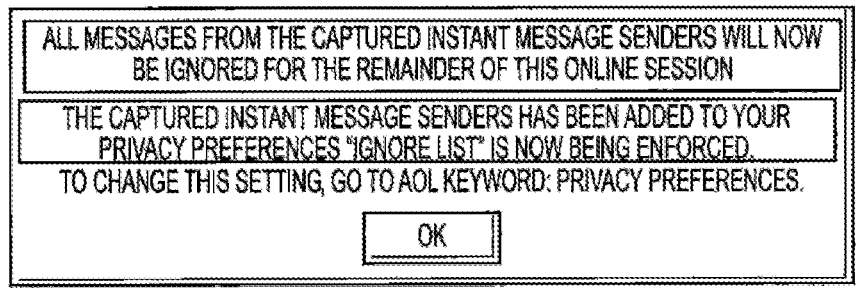

FIGS. 4A through 4C illustrate interfaces 400, 430 and 460 that are used, respectively, to confirm that the user desires to execute the screening function of the "Block" button 135, the "Ignore" button 140, or the "Ignore All" button 145 of the capture interface 100.

Figure 5:
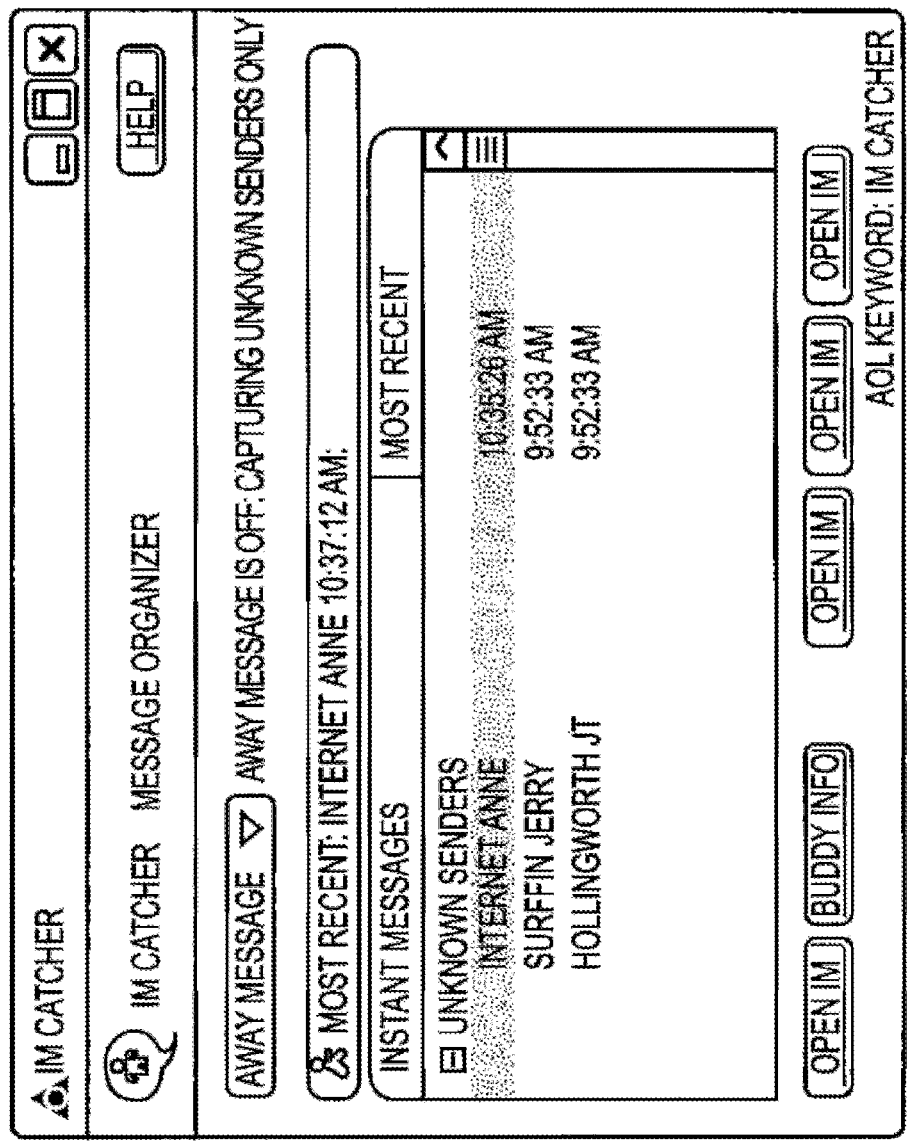

FIG. 5 illustrates the capture interface 100 in which the user is indicated to be present rather than away. The interface 100 is configured to capture only instant messages of unknown senders 120 when the user is present and to allow known senders to approach and interact freely with the user. Nevertheless, referring now to configuration interface 600 of FIG. 6, the user may use configuration settings 605 to configure the capture interface 100 to capture all instant messages, whether from known or unknown senders or whether the user is present or away. Additional configurations also may be provided, for example, to capture instant messages only of particular senders or to capture instant messages only at particular times or during particular contexts (e.g., when the user is engaged actively in a different instant message exchange that it would be perceived as rude to interrupt).

Figure 7:
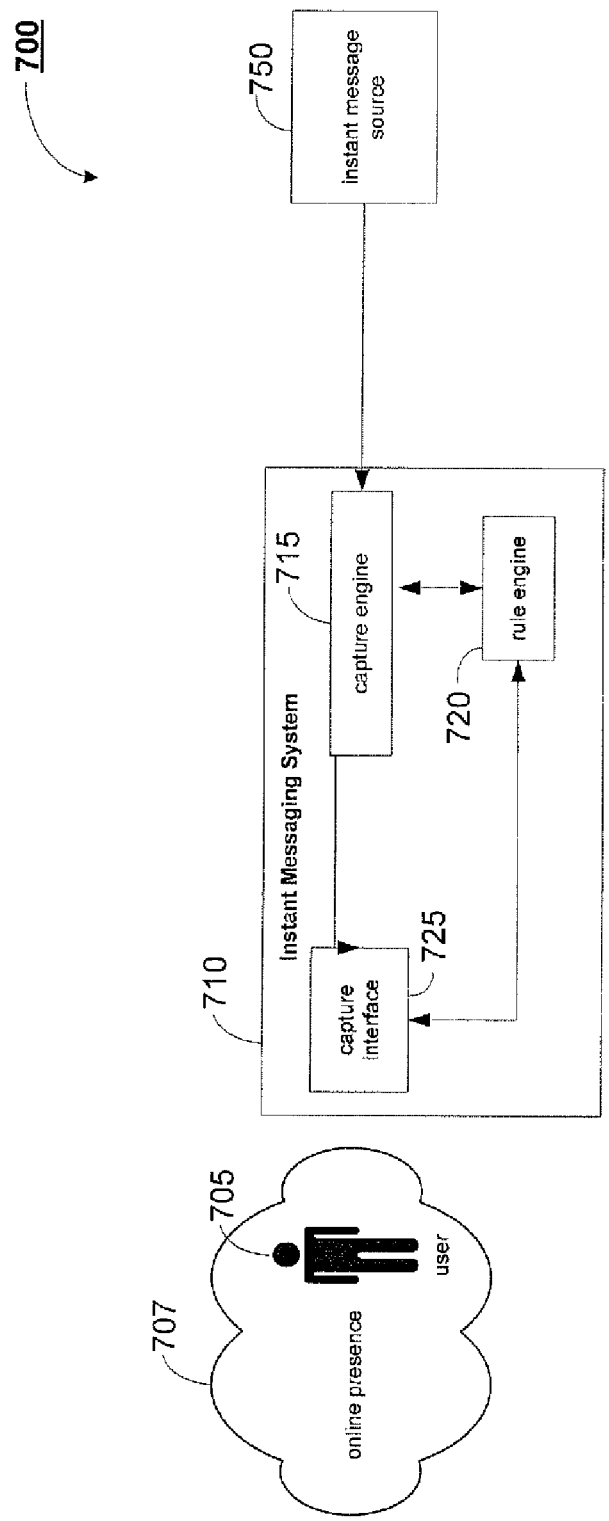
FIG. 7 is a schematic diagram of a communication system capable of managing instant messages directed to a user based on the user's online presence.

FIG. 7 shows a generalized system 700 for communicating instant messages to a user 705. System 700 includes an instant messaging system 710 that manages instant messages provided to the user 705 in real time by an instant message source 750 based on an online presence 707 of the user. Instant messaging system 710 may be implemented, for example, as a client system, as a host system, or as some combination of these or other systems. The instant messaging system 710 includes a capture engine 715, a rule engine 720, and a capture interface 725. The instant messaging system 710 may include or be included in a general-purpose or a special-purpose computer (e.g., a personal computer, a PDA, a mobile telephone, or a device specifically programmed to perform certain tasks), a database, a local area network, and/or a wide area network. The instant messaging system 710 may include any appropriate architecture or combination of architectures, such as for example, a client architecture and/or a host architecture.

The capture engine 715 is configured to capture one or more instant messages directed to the user 705 by the instant message source 750 based on interaction with the rule engine 720. The rule engine 720 compares incoming instant messages to a capture rule, and informs the capture engine 715 if the capture rule is satisfied. If the instant message satisfies the capture rule, the capture engine 715 captures the instant message to manage the instant message for the user 705. The capture interface 725 informs the user 705 of the captured instant messages in an organized fashion and without disrupting the user's other online activities. The capture interface 725 also enables the user 705 to respond to or to otherwise manage the captured instant messages.

The capture engine 715 captures the instant messages based on input from the rule engine 720 that the instant message satisfies a capture rule. The capture engine 715 may include a database to hold captured instant messages and may communicate information descriptive of the captured instant messages to the capture interface 725. The information descriptive of the captured instant messages may include, for example, an identifier of the message source, a time stamp of the instant message, a portion or summary of the instant message contents, and/or a pointer to the instant messages. In addition, or in the alternative, the capture engine 715 may tag or otherwise identify the instant messages as captured and may provide the captured instant message to the capture interface 725 for handling, storage and/or management.

The rule engine 720 enables the system or an administrator of the system to generate a capture rule. Alternatively, or in addition, the rule engine 720 may enable the user 705 or a supervisor of an online account of the user 705 to define one or more aspects of the capture rule. The capture rule may describe, in whole or in part, one or more conditions to be satisfied for an instant message to be captured. For example, the capture rule may base capture upon an identify of the message source 750, an attribute of the message, a preference or context (e.g., the user is away) of the user 705, or some combination of these or other factors. In any event, the rule engine 720 analyzes incoming instant message for satisfaction of the capture rule.

The capture interface 725 may be used to manage the instant messages directed to the user 705 while the user 705 is online. The capture interface 725 itself may receive and store the instant message or may reference and access instant messages captured and stored by another service, system or device (e.g., the capture engine 715). In any event, the capture interface 725 enables the user 705, for example, to organize, treat, respond to, block, or ignore the captured instant messages. The capture interface 725 also may enable the user 705 to modify the capture rule of the rule engine 720. For example, the capture interface 725 may enable the user to modify the capture rule directly, or may modify the capture rule automatically based upon treatment by the user 705 of one or more captured instant messages. Generally, the capture interface 725 may function similarly to capture interface 100 described with respect to FIGS. 1-6.

The instant message source 750 typically may include any source of an instant message. The instant message source 750 may employ one or more protocols to transfer information internally or to communicate the instant message to the user 705.

Both the instant messaging system 710 and the message source 750 further may include various mechanisms for delivering data. The various mechanisms may include, for example, any applications, protocols, devices, or networks used to facilitate communication of electronic data. Both the instant messaging system 710 and the message source 750 also may include or be included in a general-purpose or a special-purpose computer, a local area network, and/or a wide area network. The response to and execution of instructions received by the instant messaging system 710, the message source 750, or any of their components (collectively the system services), may be controlled by, for example, a program, a piece of code, an instruction, a device, a computer system, or a combination thereof, for independently or collectively instructing the system services to interact and operate as described herein.

Figure 8:
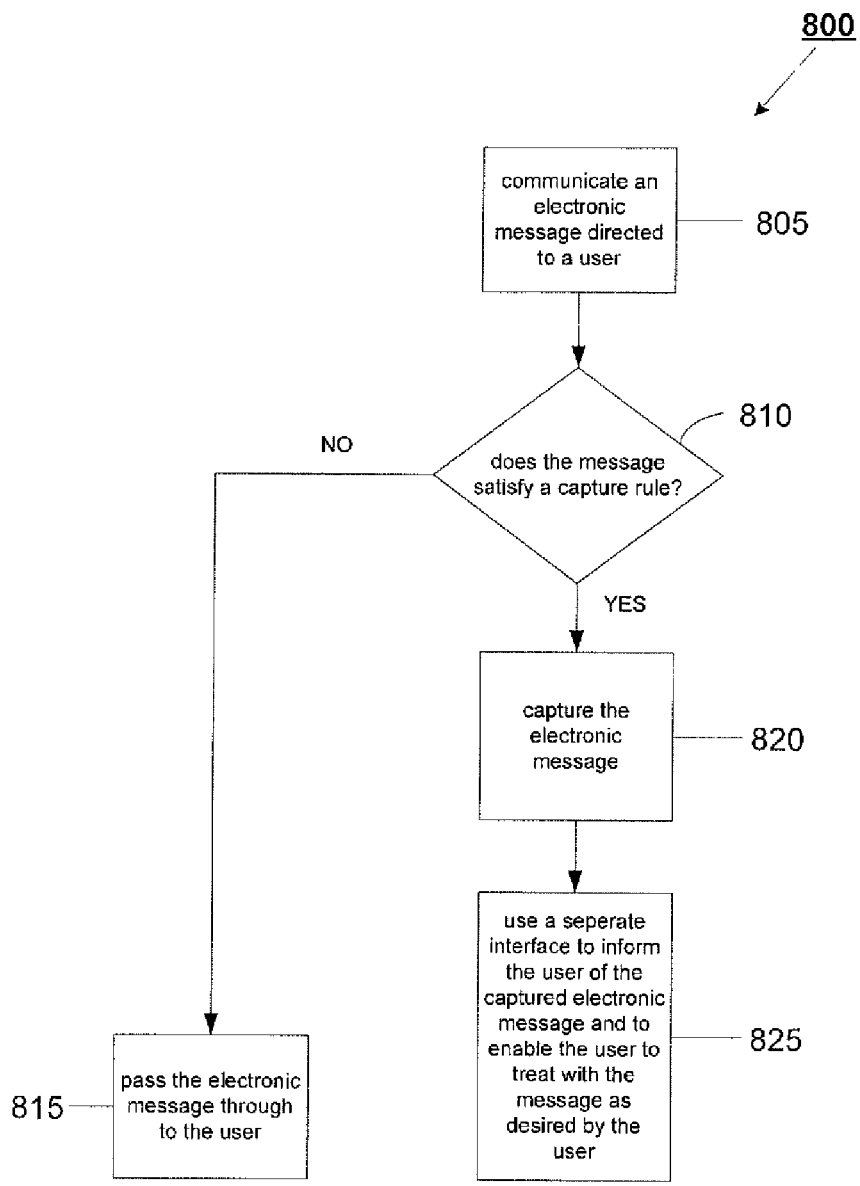
FIG. 8 is a flow diagram of a process implementable by the communication system of FIG. 7.

FIG. 8 illustrates a flow diagram of a process 800 implementable by, for example, the system 700 of FIG. 7 to manage instant messages directed to the user 705. The instant message source 750 communicates instant messages directed to the user 705 to the instant messaging system 710 (step 805). The capture engine 715 uses the rule engine 720 to determine whether the instant messages satisfy a capture rule (step 810). If an instant message fails to satisfy the capture rule, that instant message is not captured and, instead, is passed through to the user (step 815). Otherwise, when an instant message satisfies the capture rule, the capture engine 715 captures the instant message (step 820). To inform the user 705 of the captured instant messages, the capture engine 715 communicates the captured instant messages and/or information indicative of those messages to the capture interface 710 (step 825). The capture interface 725 enables the user 705 to handle the captured instant messages individually or as groups, and otherwise to respond to or to manage the instant messages as desired (step 825).

Figure 9:
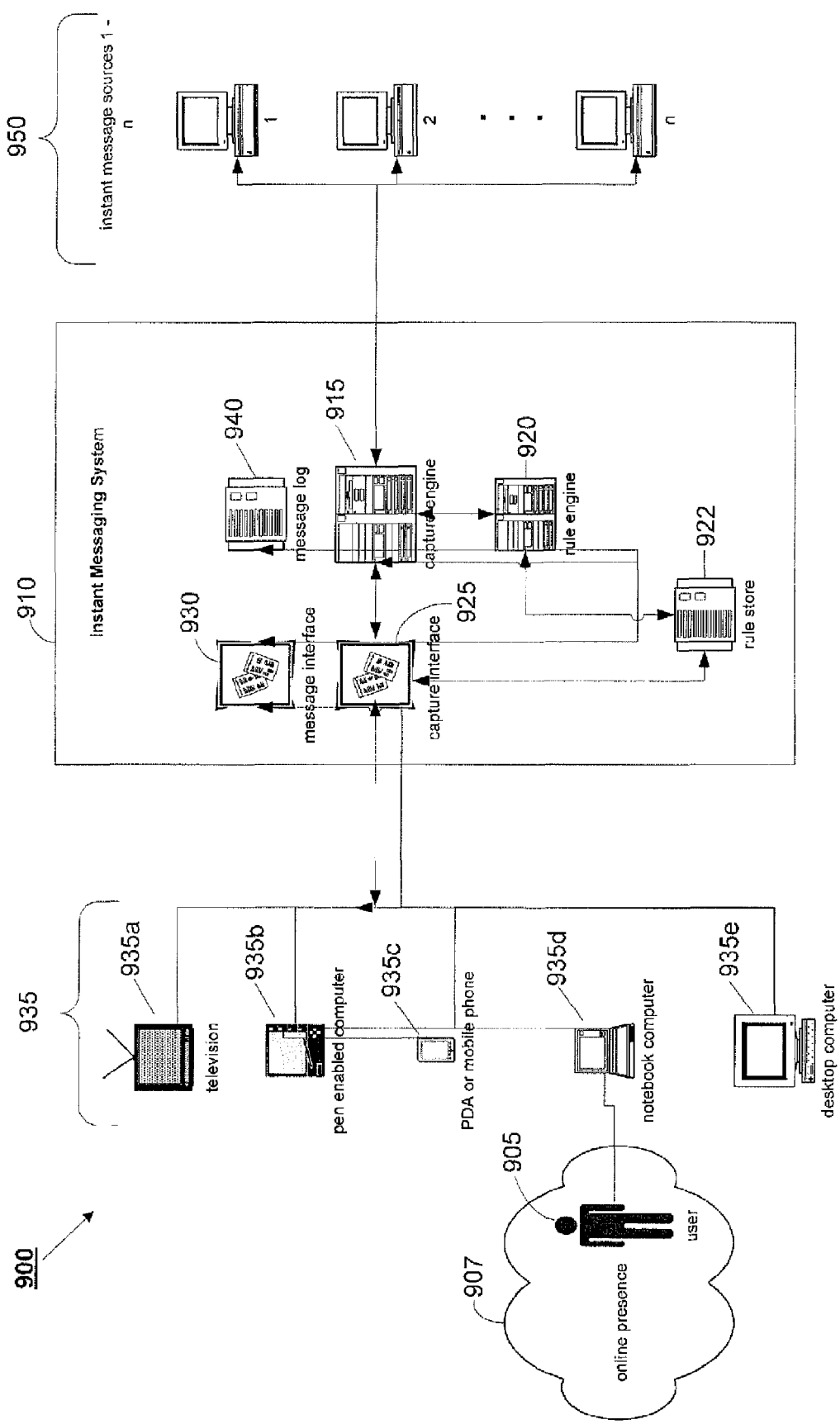
FIG. 9 is a schematic diagram of an instant messaging system that manages instant messages directed to a user based on the user's online presence.

Referring to FIG. 9, a generalized communication system 900 communicates instant messages generated by one or more instant message sources 950 to a user 905 having an online presence 907. The online presence 907 may include, for example, activity of the user 905 in browsing the internet, participating in an active instant messaging session, using an internet enabled television or game console, using a networked radio, or participating in a chat room discussion. The online presence 907 also may include an online presence of the user 905 at a particular device. Exemplary components of the communication system 900 are described in greater detail below.

The communication system 900 includes one or more message sources 950. The message sources 950 typically include different individuals, services, or other sources of instant messages, such as, for example, friends or family of the user 905, persons not known by the user 905, commercial entities, and/or one or more software bots that automatically direct messages to the user 905. The instant messages may include, for example, a personal message, a promotional advertisement, an account balance, a portfolio status, a credit status, an online status, information that an order and/or a service is complete, or a message regarding confirmation, cancellation, and/or rescheduling of an appointment. Other examples include, but are not limited to, a weather forecast and/or adverse weather conditions of a particular geographic region; an online status of another user; or entertainment programming and/or ticket information. As a practical matter, the message sources 950 may provide many instant message to the user 905 that are unsolicited and/or undesired.

The message sources 950 may employ one or more protocols (i.e., standards, formats, conventions, rules, and structures) to transfer information internally or to communicate instant messages to the user. Protocols employed by the message sources 950 may include, for example, the Internet protocol (IP), the transfer connection protocol (TCP), the hypertext transfer protocol (HTTP), the file transfer protocol (FTP), the user datagram protocol (UDP), the layer two tunneling protocol (L2TP), the simple mail transfer protocol (SMTP), the short message service (SMS), the enhanced message service (EMS), and/or the multimedia message service (MMS).

The communication system 900 includes an instant messaging system 910 that manages instant messages provided to the user 905 by the instant message sources 950 based on the online presence 907 of the user. The instant messaging system 910 includes a capture engine 915, a rule engine 920 having a rule store 922, a capture interface 925, and a message interface 930 (the system components). The instant messaging system 910 may include or be included in a general-purpose or a special-purpose computer (e.g., a personal computer, a PDA, a mobile telephone, or a device specifically programmed to perform certain tasks), a database, a local area network, and/or a wide area network. The instant messaging system 910 may include any appropriate architecture or combination of architectures, such as for example, a client architecture and/or a host architecture.

The instant messaging system 910 typically allows direct or indirect communication between the various system components, the user 905 and the instant message sources 950, irrespective of physical or logical separation. The instant message system 910 may include, for example, various mechanisms for communicating data, such as, for example, the short message service (SMS), the enhanced message service (EMS), the multimedia message service (MMS), the wireless application protocol (WAP), the transport connection protocol (TCP), the Internet protocol (IP), the World Wide Web, one or more local area networks, and/or one or more wide area networks. The instant messaging system 910 also may include analog or digital wired and wireless telephone networks, such as, for example, public switched telephone networks (PSTN), integrated services digital networks (ISDN), various types of digital subscriber lines (xDSL), advance mobile telephone service (AMPS), global system for mobile communications (GSM), general packet radio service (GPRS), code division multiple access (CDMA), radio, cable, satellite, and/or other delivery mechanisms for carrying data. The communications of the instant message system 910 may employ secured and/or unsecured communication systems.

Components of the instant messaging system 910 are described in greater detail below.

The capture engine 915 corresponds generally to the capture engine 715 of FIG. 7. Capture engine 915 is configured to capture an instant message based on an indication by the rule engine 920 that a capture rule is satisfied. If the capture rule is not satisfied, then the capture engine 915 is configured to pass the instant message through to the message interface 930 for immediate display to the user 905. The capture engine 915 may or may not store the instant messages that are captured. For example, in one implementation, the capture engine 915 stores the captured instant messages and forwards information indicative of the instant messages to the capture interface. In another implementation, the capture engine 915 merely forwards to the capture interface 925 those instant messages identified for capture and the capture interface provides or obtains any required storage.

The rule engine 920 is configured to compare the instant messages to a capture rule of the rule store 922 and/or to analyze the instant message in view of the capture rule. The rule engine 920 may perform, for example, Bayesian or heuristic analysis of the instant messages based on the capture rule. The rule engine 920 is configured to inform the capture engine 915 when an instant message satisfies the capture rule.

Generally, the capture rule may define, in whole or in part, one or more conditions to be satisfied by the source, content, and/or timing of an instant message before capture of the instant message. The capture rule may be generated by the system or by an administrator of the system. The capture rule also may be based on preferences of the user, whether provided by the user or determined automatically by the system in view of user behavior. In short, the capture rule may enable the user 905 flexibly to manage which instant messages are received directly, which instant messages are blocked completely, and which instant message are captured to be screened by the user 905.

The capture rule may include a white list defining approved instant message sources 950 (e.g., family, friends, or co-workers) and/or a black list defining objectionable instant message sources 950 (e.g., known purveyors of offensive spam) that are to be blocked. The white list and/or black list may be based on input of a rating authority or by a community of raters. Although the white list or the black list may be provided initially as a default, the user may be enabled to modify or replace either the white list or the black list to better fit the user's preferences.

Message source categories (e.g., individual, business, or business:gambling) also may be used to control communication with instant message sources 950 that include an associated category label. For example, a message source 950 may be identified as an online casino by an associated category label of "business:gambling" and may be restricted based on that label. Generally, to communicate an instant message to the user 905, a message source may be required to provide meaningful and trustworthy information by which the message source may be identified and/or classified.

The capture rule also may control capture, filtering, or ranking of an instant message based on a degree of separation between the user 905 and the message source 950 under a rationale, for example, that the user is more inclined to receive an instant message from a friend of a friend than from an individual not connected to the user. More specifically, the degree of separation between the user 905 and the message source 950 describes a number of intermediary relationships needed to link the user and the message source. Typically, user contact lists (e.g., address book, buddy list, and/or white list) are evaluated to determine the number of degrees (or relationships) needed to link two users.

Figure 10:
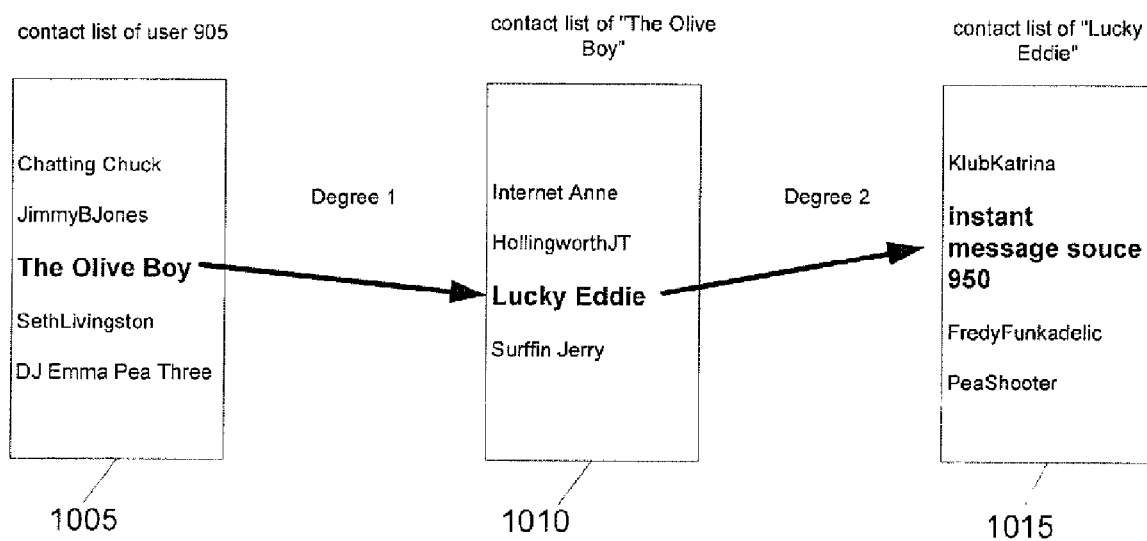
FIG. 10 illustrates a relationship between a user and an instant message source having two degrees of separation.

Referring briefly to FIG. 10, for example, the user 905 may link to the instant message source 950 through two degrees of separation based on contact lists of the user, "The Olive Boy," and of "Lucky Eddie." More specifically, the user has a contact list 1005 that lists "The Olive Boy." The contact list 1010 of "The Olive Boy," in turn, lists "Lucky Eddie," whose contact list 1015 lists the instant message source 950—and establishes the connection between the user 905 and the message source 950. Here, the user 905 is linked to the message source 950 by two degrees of separation (the relationship between "The Olive Boy" and "Lucky Eddie" providing the first degree, and the relationship between "Lucky Eddie" and the instant messaging source 950 providing the second degree). Stated differently, the user 905 is related to "Lucky Eddy" by one degree of separation (i.e., their common relationship to "The Olive Boy"), and "The Olive Boy" is separated from the instant message service 950 by one degree of separation (i.e., their common relationship to "Lucky Eddie"). Similarly, the user 905 and "The Olive Boy," "The Olive Boy" and "Lucky Eddie," and "Lucky Eddie" and the instant message source 950 each respectively are separated by zero degrees of separation.

In short, the capture rule may control capturing, filtering, or ranking of an instant message based on: (1) whether the user 905 and the messages source 950 are discernibly linked; and (2) if they are linked, the number of degrees of separation (e.g., relationships or intermediaries) needed to complete the link.

Referring back to FIG. 9, the capture rule also may include other rule information, such as, for example, key words and/or parameters useful for analyzing natural language. The capture rule may enable the rule engine 920 to restrict instant messages based upon textual analysis of their content. More specifically, the capture rule may enable the rules engine 920 to analyze the language of an instant message to determine whether the instant message includes offensive language or subject matter, or whether the language used is indicative of an unsolicited spam message. The user may be enabled to select or modify the information or algorithms used to screen the online content based on the textual analysis. For example, the capture rule may include user defined dictionaries of terms that may cause an instant message to be delivered immediately, blocked, or passed through when included in the instant message.

The capture rule may enable the user to specify times during which instant messages may or may not be received. For example, the user may restrict receipt of instant messages between the hours of 8:30 am and 5 pm during the work week, but may allow instant messages to be received with less restriction during the evenings and on the weekends while the user is not at work. More specifically, the user may use the capture rule to specify that, during working hours, instant messages of co-workers or clients are to be received, spam messages are to be blocked, and messages from friends or family are to be captured. On the other hand, when not at work, instant messages from co-workers and clients may be captured while messages from friends and family are received immediately.

Additional rule information also may be included, such as, for example, logging or reporting rules. The logging or reporting rules, for example, may indicate provision of a message log 940 to record all of the instant messages directed to the user 905 whether in the present or a past online session. The message log 940 may record whether the instant message was captured and what, if any, activity the user took with respect to the instant message.

The rule store 922 generally receives, stores and administers rule information used to supervise instant messaging by the instant messaging system 910. The rule store 922 may include one or more databases that may reside at any appropriate location (e.g., local location, remote location, or third party location), and also may reside on any appropriate storage medium, such as, for example, a magnetic disc array, or an optical disk array. These databases may be included in a single physical or logical structure, or they may be physically or logically distinct. The rule store 922 generally includes a data structure that enables the rule information and/or other information to be organized and accessed quickly and efficiently. For example, the rule store 922 may organize rule information using fields, records, or files. The rule store 922 may include database management systems that organize data based on relational, network, flat, or hierarchical architectures. The rule store 922 also may include a hypertext database to link data objects such as text, images, or video to other data objects. The rule store 922 may store the rule information locally, remotely, or in a distributed fashion. In any event, the rule store 922 organizes the rule information for effective access and use by the rule engine 920.

Capture interface 925 may function similarly to capture interface 100 described with respect to FIGS. 1-6. The capture interface 925 receives captured instant messages or information indicative of those messages from the capture engine 915 for display to the user 905. The capture interface, alone or in conjunction with other services, may perform sorting, prioritizing, or other types of organizational processing on the captured instant messages to enable the user 905 to manage the instant messages. For example, the capture interface 925 may prioritize captured instant messages based on a predicted relevance or likelihood of interest. The predicted relevance or likelihood of interest may be related to the subject matter and/or source of an instant message. For example, the capture interface 925 may give a higher priority to an instant message from an individual not known to the user but who is indicated to share a common interest than is given to an instant message from a software bot that presents a marketing invitation having objectionable content.

The capture interface 925 also may enable the user 905 to modify the capture rule of the rule engine 920. For example, the capture interface 925 may enable the user to modify the capture rule directly, or may modify the capture rule automatically based upon treatment by the user 905 of one or more captured instant messages. The capture interface 925 may display to the user 905 a source of an instant message, a time stamp, a count of the number of instant messages sent and/or received, a summary of instant message content, and/or the captured instant messages themselves. The capture interface 925 may enable the user to approve, block or ignore one or more instant messages or instant message sources. Generally, the capture interface 925 enables the user 905 to organize, respond to, block, ignore, or otherwise manage instant messages in a manner similar to that which was described with respect to the interfaces of FIGS. 1-6.

The capture interface 925 may include or operate in conjunction with one or more of the fixed or mobile communication devices 935, whether wired or wireless. The fixed or mobile communication devices 935 may include any device, system, and/or piece of code that relies on another service to perform an operation. For example, the communication devices 935 may include a device such as a television 935*a*, a pen-enabled computer 935*b*, a personal digital assistant (PDA) or mobile telephone 935*c*, a notebook computer 935*d*, and/or a desktop computer 935*e*. The communication devices 935 also or alternatively may include, for example, a Web browser, an instant messaging (IM) client, a synchronization client (e.g., a calendar synchronization client or a task list synchronization client), a short message service (SMS) client, a business productivity application (e.g., a word processing program or a spreadsheet program), and/or an operating system or operating system kernel residing on a device. The communication devices 935 may be arranged to operate within or in concert with one or more other systems, such as, for example, the Internet, the World Wide Web, a WAN (wide area network), a LAN (local area network), analog or digital wired and wireless telephone networks (e.g., PSTN, ISDN, or xDSL), radio, television, cable, satellite, and/or any other delivery mechanism for carrying data. In any event, the capture interface 925 enables the user 905, for example, to organize, treat, respond to, block, or ignore the captured instant messages.

One or more other services may be included in the components of communication system 900 and/or these components (hereinafter the system services) may be included as part of one or more other services. For example, the system services may include or be included in a general-purpose or a special-purpose computer (e.g., a personal computer, a PDA, or a device specifically programmed to perform certain tasks), a database, a local area network, and/or a wide area network. In any event, the response to and execution of instructions received by any or all of the system services may be controlled by, for example, a program, a piece of code, an instruction, a device, a computer system, or a combination thereof, for independently or collectively instructing the services to interact and operate as described herein.

Figure 11:
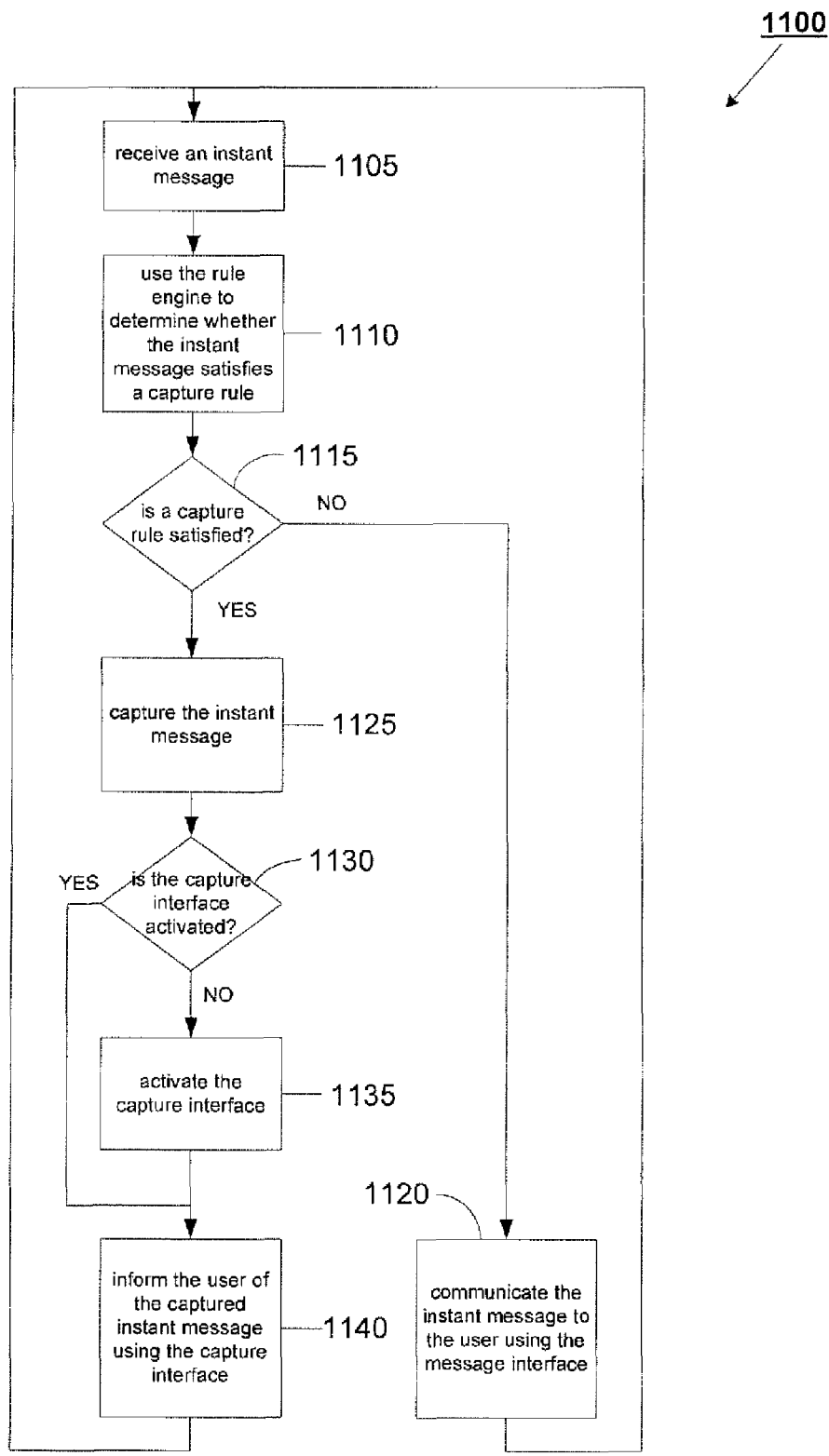
FIG. 11 is a flow diagram illustrating an exemplary process implementable by the system of FIG. 9.

FIG. 11 illustrates a flow diagram of a process 1100 implementable by, for example, the system 900 of FIG. 9 to manage instant messages directed to the user 905. An instant message initially is received from a message source 950 by the capture engine 915 (step 1105). The rule engine 920 is used to determine whether the instant message satisfies a capture rule (step 1110). If a capture rule is not satisfied (step 1115), the instant message is communicated to the user 905 using the message interface to grab the user's immediate attention (step 1120). The system then waits for receipt of the next instant message directed to the user 905 (step 1105).

If a capture rule is satisfied (step 1115), the instant message is captured by the capture engine 915 (step 1125). The capture interface 925 may be configured to be activated automatically when a first instant message is captured during an online session. In addition, or in the alternative, the capture interface 925 may be configured to be activates based on an input or a request of the user 905. If the capture interface 925 is not activated already (step 1130), then the instant messaging system 910 activates the capture interface 925 (step 1135). In any event, once the capture interface is activated (step 1135) or is determined already to be active (step 1130), the instant message and/or information indicative of the instant message is communicated to the capture interface 925 to inform the user 905 of the instant message and to enable the user to manage the instant message and any other instant messages that have been captured (step 1140). The system then waits for receipt of the next instant message directed to the user 905 (step 1105).

Other implementations are within the scope of the following claims.

What is claimed is:

1. A method comprising:
   receiving, from an electronic message source, an electronic message directed to a user;
   detecting one or more online activities associated with the user;
   determining an online context of the user based on the detected one or more online activities associated with the user;
   determining, using at least one processor, that the electronic message satisfies a capture rule that relates to the online context of the user; and
   capturing the electronic message based on the determination that the electronic message satisfies the capture rule.

2. The method as recited in claim 1, further comprising generating the capture rule.

3. The method as recited in claim 2, further comprising enabling the user to define one or more aspects of the capture rule.

4. The method as recited in claim 3, wherein the capture rule bases capture on the online context of the user and at least one of an identity of the electronic message source, an attribute of the electronic message, a preference of the user, or a presence of a keyword in the electronic message.

5. The method as recited in claim 1, further comprising enabling the user to specify the online context of the user.

6. The method as recited in claim 5, wherein the online context of the user comprises at least one of the user engaging in an electronic messaging session of which the electronic message is not a part, the user being away, the user browsing the Internet, the user using an entertainment device, or the user using a mobile device.

7. The method as recited in claim 6, wherein the entertainment device comprises at least one of an Internet enabled television or a video game console.

8. The method as recited in claim 1, further comprising comparing the electronic message and comparing the online context of the user to one or more criteria of the capture rule.

9. The method as recited in claim 8, further comprising performing textual analysis on the electronic message.

10. The method as recited in claim 9, wherein results of the textual analysis show whether the electronic message contains at least one of offensive language or objectionable subject matter.

11. The method as recited in claim 1, further comprising sorting the electronic message based on a predicted relevance of the electronic message to the user.

12. The method as recited in claim 1, wherein the electronic message comprises at least one of an instant message or an e-mail message.

13. A non-transitory computer-readable storage medium storing instructions thereon that, when executed by at least one processor, cause a computer system to:
   receive an electronic message directed to a user from an electronic message source;
   detect or more online activities associated with the user;
   determine an online context of the user based on the detected one or more online activities associated with the user;
   determine that the electronic message satisfies a capture rule that relates to the online context of the user; and
   capture the electronic message based on the determination that the electronic message satisfies the capture rule.

14. The non-transitory computer-readable storage medium as recited in claim 13, further comprising instructions that, when executed, cause the computer system to generate the capture rule.

15. The non-transitory computer-readable storage medium as recited in claim 14, wherein the capture rule bases capture on the online context of the user and at least one of an identity of the electronic message source, an attribute of the electronic message, a preference of the user, or a presence of a keyword in the electronic message.

16. The non-transitory computer-readable storage medium as recited in claim 13, further comprising instructions that, when executed, cause the computer system to enable the user to modify the capture rule.

17. The non-transitory computer-readable storage medium as recited in claim 16, further comprising instructions that, when executed, cause the computer system to modify the capture rule in response to input from the user.

18. The non-transitory computer-readable storage medium as recited in claim 16, further comprising instructions that, when executed, cause the computer system to modify the capture rule automatically based upon treatment by the user of the electronic message.

19. The non-transitory computer-readable storage medium as recited in claim 13, further comprising instructions that, when executed, cause the computer system to:
   compare the electronic message to one or more criteria of the capture rule; and compare the online context of the user to the one or more criteria of the capture rule.

20. The non-transitory computer-readable storage medium as recited in claim 19, further comprising instructions that, when executed, cause the computer system to perform textual analysis on the electronic message.

21. The non-transitory computer-readable storage medium as recited in claim 13, further comprising instructions that, when executed, cause the computer system to tag the electronic message to identify that the electronic message has been captured.

22. The non-transitory computer-readable storage medium as recited in claim 13, further comprising instructions that, when executed, cause the computer system to enable the user to organize, treat, respond to, block, or ignore the electronic message that has been captured.

23. The non-transitory computer-readable storage medium as recited in claim 13, further comprising instructions that, when executed, cause the computer system to enable display to the user of an unobtrusive indication that the electronic message has been captured.

24. A mobile communication device comprising:
at least one processor; and
at least one non-transitory computer readable storage medium storing, instructions thereon that, when executed by at least one processor, cause the mobile communication device to:
receive an electronic message directed to a user from an electronic message source;
detect one or more online activities associated with the user;
determine an online context of the user based on the detected one or more online activities associated with the user;
determine that the electronic message satisfies a capture rule that relates to the online context of the user; and
capture the electronic message based on the determination that the electronic message satisfies the capture rule.

25. The mobile communication device as recited in claim 24, further comprising instructions that, when executed, cause the mobile communication device to generate the capture rule.

26. The mobile communication device as recited in claim 25, further comprising instructions that, when executed, cause the mobile communication device to:
compare the electronic message to one or more criteria of the capture rule; and
compare the online context of the user to the one or more criteria of the capture rule.

27. The mobile communication device as recited in claim 26, further comprising instructions that, when executed, cause the mobile communication device to perform textual analysis on the electronic message.

28. The mobile communication device as recited in claim 27, wherein the capture rule bases capture on the online context of the user and at least one of an identity of the electronic message source, an attribute of the electronic message, a preference of the user, or a presence of a keyword in the electronic message.

29. The mobile communication device as recited in claim 27, wherein the textual analysis determines whether the electronic message contains at least one of offensive language or objectionable subject matter.

30. The mobile communication device as recited in claim 24, further comprising instructions that, when executed, cause the mobile communication device to sort the electronic message based on a predicted relevance of the electronic message to the user.

31. The mobile communication device as recited in claim 24, further comprising instructions that, when executed, cause the mobile communication device to enable display to the user of an unobtrusive indication that the electronic message has been captured.

* * * * *